US011409662B2

(12) United States Patent
Durham et al.

(10) Patent No.: US 11,409,662 B2
(45) Date of Patent: Aug. 9, 2022

(54) APPARATUS AND METHOD FOR EFFICIENT PROCESS-BASED COMPARTMENTALIZATION

(71) Applicant: Intel Corporation, Santa Clara, CA (US)

(72) Inventors: David M. Durham, Beaverton, OR (US); Jacob Doweck, Haifa, IL (US); Michael Lemay, Hillsboro, OR (US); Deepak Gupta, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 17/321,087

(22) Filed: May 14, 2021

(65) Prior Publication Data
US 2021/0311883 A1 Oct. 7, 2021

Related U.S. Application Data

(63) Continuation of application No. 16/728,928, filed on Dec. 27, 2019, now Pat. No. 11,030,113.

(51) Int. Cl.
G06F 12/10 (2016.01)
G06F 12/1027 (2016.01)

(52) U.S. Cl.
CPC .... G06F 12/1027 (2013.01); G06F 2212/681 (2013.01)

(58) Field of Classification Search
CPC ......... G06F 12/10–1036; G06F 12/109; G06F 2212/681
See application file for complete search history.

(56) References Cited

U.S. PATENT DOCUMENTS 9,753,754 B2* 9/2017 Howell ............... G06F 11/1484
2002/0065993 A1 5/2002 Chauvel
(Continued)

OTHER PUBLICATIONS

Z. Yan, J. Veselý, G. Cox and A. Bhattacharjee, "Hardware translation coherence for virtualized systems," 2017 ACM/IEEE 44th Annual International Symposium on Computer Architecture (ISCA), 2017, pp. 430-443, doi: 10.1145/3079856.3080211. (Year: 2017).*
(Continued)

Primary Examiner — Khoa D Doan
(74) Attorney, Agent, or Firm — Nicholson De Vos Webster & Elliott LLP

(57) ABSTRACT

An apparatus and method for efficient process-based compartmentalization. For example, one embodiment of a processor comprises: execution circuitry to execute instructions and process data; memory management circuitry coupled to the execution circuitry, the memory management circuitry to manage access to a system memory by a plurality of related processes using one or more process-specific translation structures and one or more shared translation structures to be shared by the related processes; and one or more control registers to store a process-specific base address pointer associated with a first process of the plurality of related processes and to store a shared base address pointer to identify the shared translation structures; wherein the memory management circuitry is to use the process-specific base address pointer in combination with a first linear address provided by the first process to walk the process-specific translation structures to identify any permissions and/or physical address associated with the first linear address, wherein if permissions are identified, the memory management circuitry is to use the permissions in place of any permissions specified in the shared translation structures.

24 Claims, 31 Drawing Sheets

(56) References Cited

U.S. PATENT DOCUMENTS

2016/0364341 A1    12/2016   Banginwar et al.
2016/0371496 A1    12/2016   Sell
2017/0249260 A1     8/2017   Sahita et al.
2017/0300425 A1    10/2017   Meredith et al.
2020/0050553 A1     2/2020   El Hajj et al.

OTHER PUBLICATIONS

Mohamed et al., "A scheme for implementing address translation storage buffers," Proceedings of the 2002 IEEE Canadian Conference on Electrical and Computer Engineering, 2002, pp. 626-632.
Notice of Allowance, U.S. Appl. No. 16/728,928, dated Feb. 22, 2021, 10 pages.
Final Office Action, U.S. Appl. No. 16/728,800, dated Dec. 13, 2021, 7 pages.
Non-Final Office Action, U.S. Appl. No. 16/728,800, dated Aug. 11, 2021, 7 pages.
Notice of Allowance, U.S. Appl. No. 16/728,800, dated Mar. 28, 2022, 7 pages.

\* cited by examiner

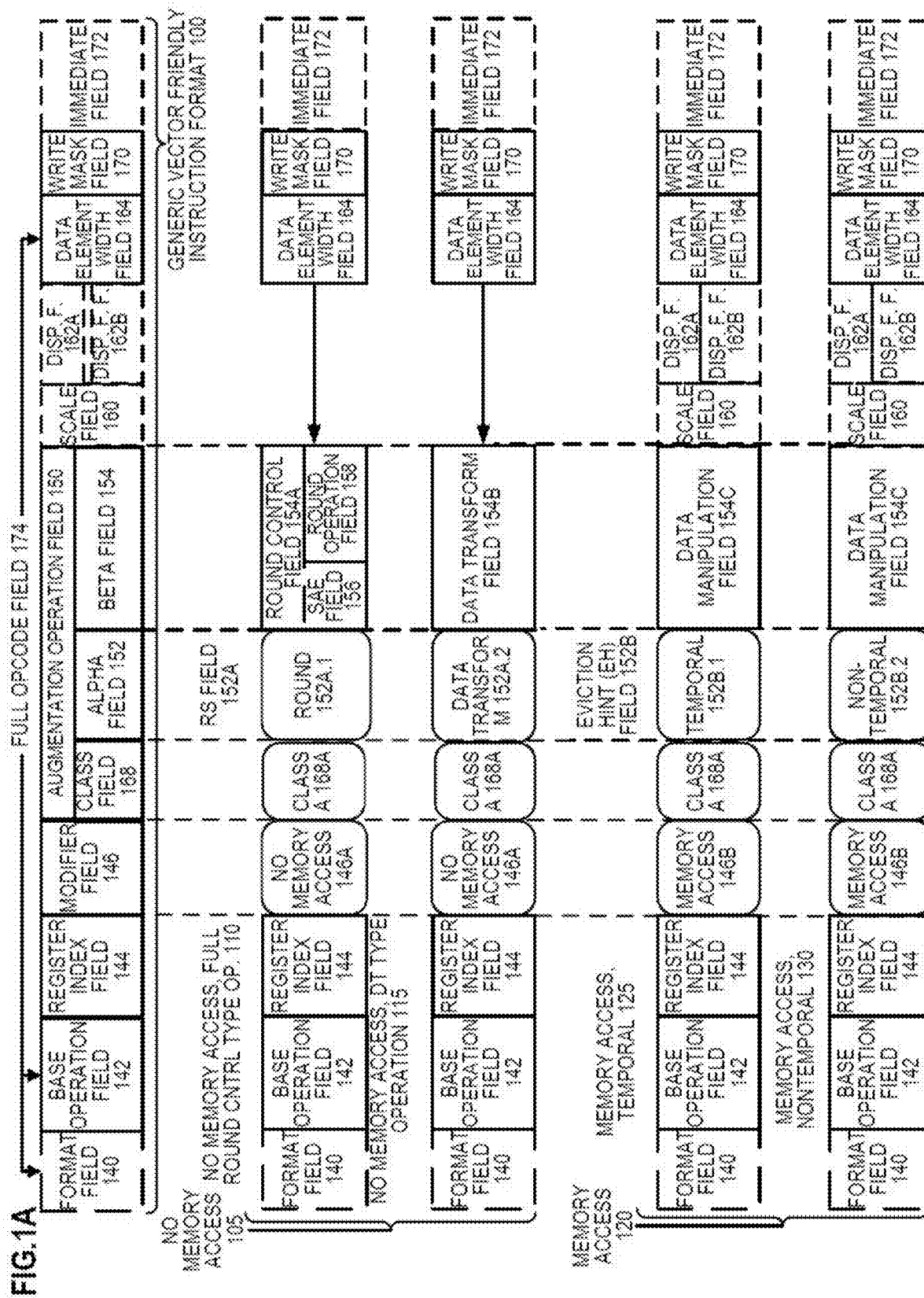

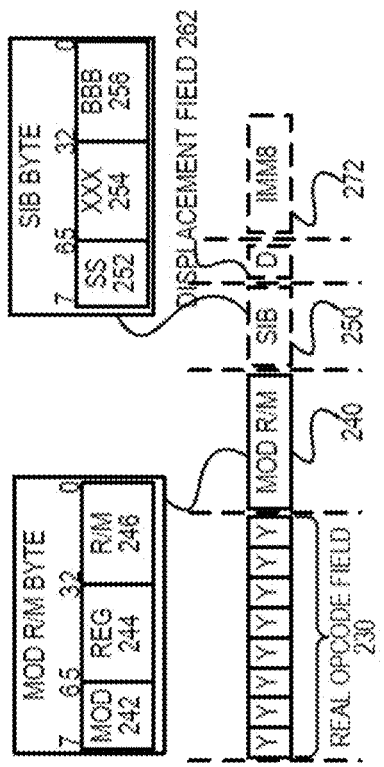
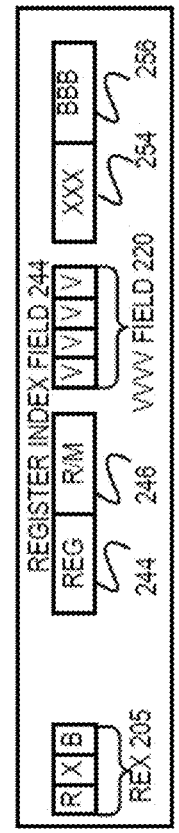
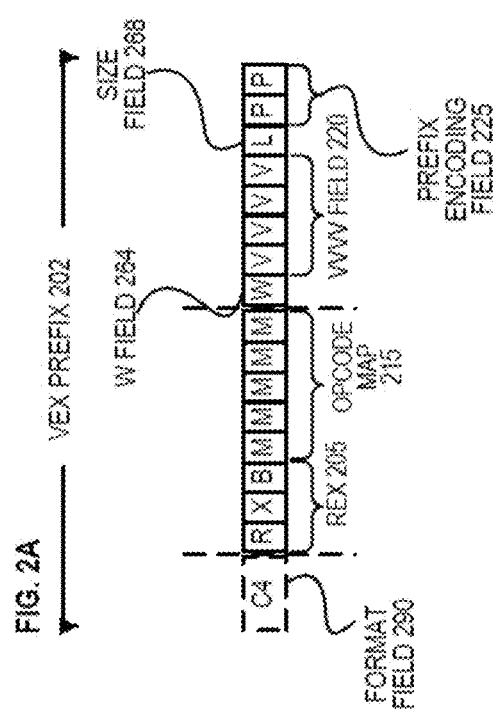
FIG. 2A
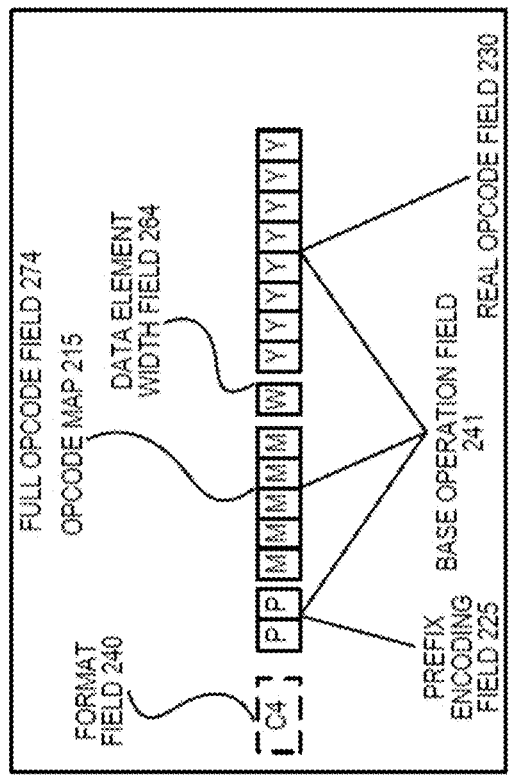
FIG. 2C
FIG. 2B

| 63:M+5 | M+4:18 | 17:2 | 1 | 0 |
|---|---|---|---|---|
| Reserved | COMP_EXIT_RIP | CurrCompId | InNonNativeComp | En |

| 63:M | M-1:12 | 11:0 |
|---|---|---|
| Reserved | ROOT_LATT_PA | Reserved |

| 63:48 | 47:0 |
|---|---|
| MismatchedTagId | Reserved |

APPARATUS AND METHOD FOR EFFICIENT PROCESS-BASED COMPARTMENTALIZATION

CROSS REFERENCE TO RELATED APPLICATIONS

This application is a continuation of co-pending U.S. application Ser. No. 16/728,928, filed on Dec. 27, 2019, all of which is herein incorporated by reference.

BACKGROUND

Field of the Invention

The embodiments of the invention relate generally to the field of computer processors. More particularly, the embodiments relate to a memory management apparatus and method for compartmentalization using linear address metadata.

Description of the Related Art

In current processors, a virtual address is translated to a physical address using a set of page tables managed by the processor's address translation circuitry. A pointer stored in one or more control registers (e.g., a CR3 register) points to a base translation table and different portions of the virtual address are used to identify different levels of translation tables to generate the physical address.

Software is becoming increasingly complex, with different components, functionalities, and security boundaries. In particular, the model of well-defined boundaries is often implemented for security, to isolate different components of an application. From a hardware perspective, however, an entire application is in one process address space. Consequently, there is no memory isolation between components and a security bug (such as an exploitable memory corruption) in one component can lead to the entire application being compromised. Software vendors have attempted to mitigate this issue by placing these components in different processes. While process isolation provides a natural defense, it results in added memory overhead, performance impacts in terms of latency and responsiveness, and potentially increased power usage.

BRIEF DESCRIPTION OF THE DRAWINGS

A better understanding of the present invention can be obtained from the following detailed description in conjunction with the following drawings, in which:

FIGS. 1A and 1B are block diagrams illustrating a generic vector friendly instruction format and instruction templates thereof according to embodiments of the invention;

FIGS. 2A-C are block diagrams illustrating an exemplary VEX instruction format according to embodiments of the invention;

FIGS. 19A-C illustrate three control registers used in one embodiment;

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures, Instruction Formats, and Data Types

An instruction set includes one or more instruction formats. A given instruction format defines various fields (number of bits, location of bits) to specify, among other things, the operation to be performed (opcode) and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands.

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 1B:
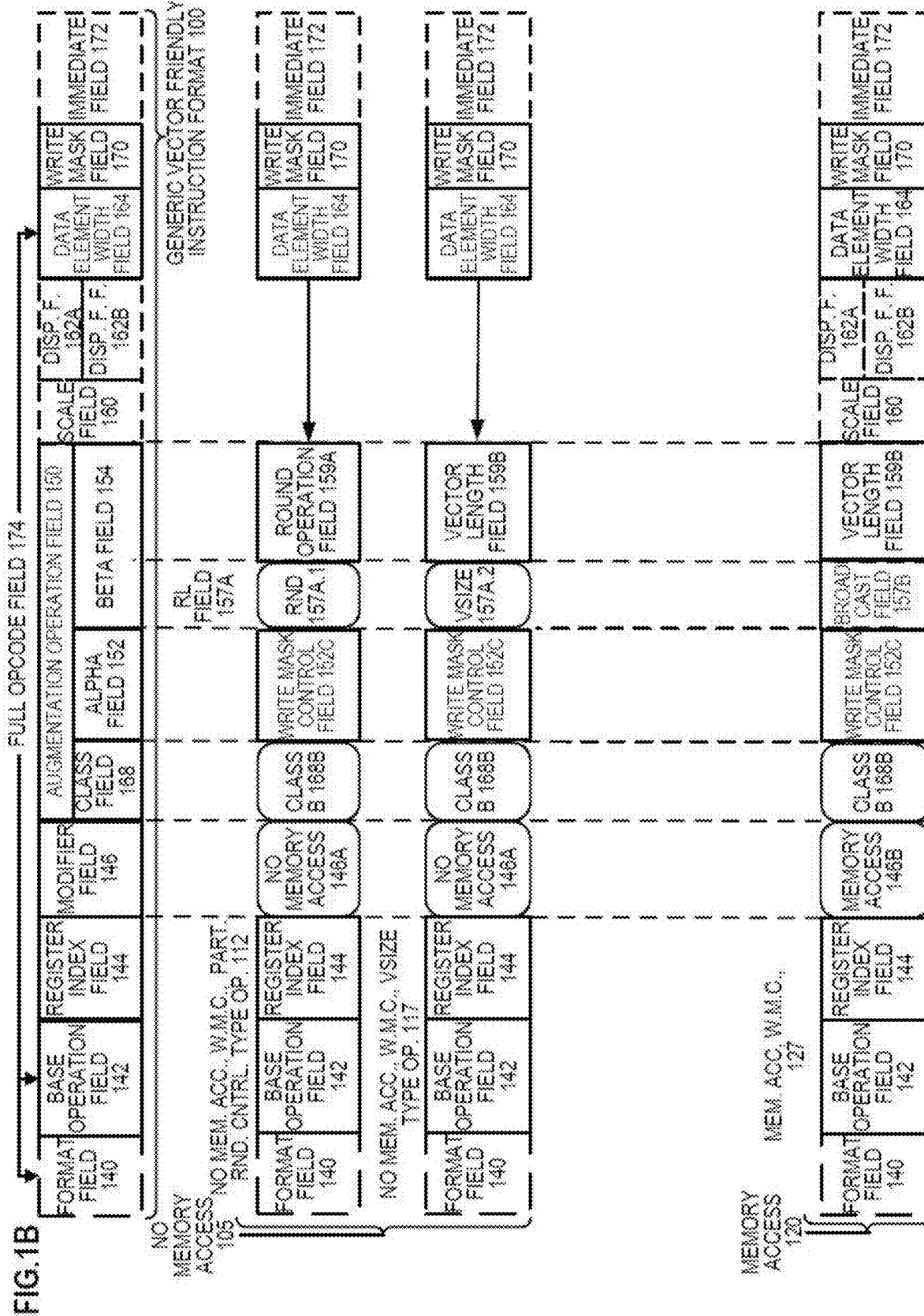

FIGS. 1A-1B are block diagrams illustrating a generic vector friendly instruction format and instruction templates thereof according to embodiments of the invention. FIG. 1A is a block diagram illustrating a generic vector friendly instruction format and class A instruction templates thereof according to embodiments of the invention; while FIG. 1B is a block diagram illustrating the generic vector friendly instruction format and class B instruction templates thereof according to embodiments of the invention. Specifically, a generic vector friendly instruction format 100 for which are defined class A and class B instruction templates, both of which include no memory access 105 instruction templates and memory access 120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 1A include: 1) within the no memory access 105 instruction templates there is shown a no memory access, full round control type operation 110 instruction template and a no memory access, data transform type operation 115 instruction template; and 2) within the memory access 120 instruction templates there is shown a memory access, temporal 125 instruction template and a memory access, non-temporal 130 instruction template. The class B instruction templates in FIG. 1B include: 1) within the no memory access 105 instruction templates there is shown a no memory access, write mask control, partial round control type operation 112 instruction template and a no memory access, write mask control, vsize type operation 117 instruction template; and 2) within the memory access 120 instruction templates there is shown a memory access, write mask control 127 instruction template.

The generic vector friendly instruction format 100 includes the following fields listed below in the order illustrated in FIGS. 1A-1B.

Format field 140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 142—its content distinguishes different base operations.

Register index field 144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 146—its content distinguishes occurrences of instructions in the generic vector instruction format that specify memory access from those that do not; that is, between no memory access 105 instruction templates and memory access 120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 150—its content distinguishes which one of a variety of different operations to be performed in addition to the base operation. This field is context specific. In one embodiment of the invention, this field is divided into a class field 168, an alpha field 152, and a beta field 154. The augmentation operation field 150 allows common groups of operations to be performed in a single instruction rather than 2, 3, or 4 instructions.

Scale field 160—its content allows for the scaling of the index field's content for memory address generation (e.g., for address generation that uses $2^{scale}*\text{index}+\text{base}$).

Displacement Field 162A—its content is used as part of memory address generation (e.g., for address generation that uses $2^{scale}*\text{index}+\text{base}+\text{displacement}$).

Displacement Factor Field 162B (note that the juxtaposition of displacement field 162A directly over displacement factor field 162B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 174 (described later herein) and the data manipulation field 154C. The displacement field 162A and the displacement factor field 162B are optional in the sense that they are not used for the no memory access 105 instruction templates and/or different embodiments may implement only one or none of the two.

Data element width field 164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 170 allows for partial vector operations, including loads, stores, arithmetic, logical, etc. While embodiments of the invention are described in which the write mask field's 170 content selects one of a number of write mask registers that contains the write mask to be used (and thus the write mask field's 170 content indirectly identifies that masking to be performed), alternative embodiments instead or additional allow the mask write field's 170 content to directly specify the masking to be performed.

Immediate field 172—its content allows for the specification of an immediate. This field is optional in the sense that is it not present in an implementation of the generic vector friendly format that does not support immediate and it is not present in instructions that do not use an immediate.

Class field 168—its content distinguishes between different classes of instructions. With reference to FIGS. 1A-B, the contents of this field select between class A and class B instructions. In FIGS. 1A-B, rounded corner squares are used to indicate a specific value is present in a field (e.g., class A 168A and class B 168B for the class field 168 respectively in FIGS. 1A-B).

Instruction Templates of Class A

In the case of the non-memory access 105 instruction templates of class A, the alpha field 152 is interpreted as an RS field 152A, whose content distinguishes which one of the different augmentation operation types are to be performed (e.g., round 152A.1 and data transform 152A.2 are respectively specified for the no memory access, round type operation 110 and the no memory access, data transform type operation 115 instruction templates), while the beta field 154 distinguishes which of the operations of the specified type is to be performed. In the no memory access 105 instruction templates, the scale field 160, the displacement field 162A, and the displacement scale filed 162B are not present.

No-Memory Access Instruction Templates—Full Round Control Type Operation

In the no memory access full round control type operation 110 instruction template, the beta field 154 is interpreted as a round control field 154A, whose content(s) provide static rounding. While in the described embodiments of the invention the round control field 154A includes a suppress all floating point exceptions (SAE) field 156 and a round operation control field 158, alternative embodiments may support may encode both these concepts into the same field or only have one or the other of these concepts/fields (e.g., may have only the round operation control field 158).

SAE field 156—its content distinguishes whether or not to disable the exception event reporting; when the SAE field's 156 content indicates suppression is enabled, a given instruction does not report any kind of floating-point exception flag and does not raise any floating point exception handler.

Round operation control field 158—its content distinguishes which one of a group of rounding operations to perform (e.g., Round-up, Round-down, Round-towards-zero and Round-to-nearest). Thus, the round operation control field 158 allows for the changing of the rounding mode on a per instruction basis. In one embodiment of the invention where a processor includes a control register for specifying rounding modes, the round operation control field's 150 content overrides that register value.

No Memory Access Instruction Templates—Data Transform Type Operation

In the no memory access data transform type operation 115 instruction template, the beta field 154 is interpreted as a data transform field 154B, whose content distinguishes which one of a number of data transforms is to be performed (e.g., no data transform, swizzle, broadcast).

In the case of a memory access 120 instruction template of class A, the alpha field 152 is interpreted as an eviction hint field 152B, whose content distinguishes which one of the eviction hints is to be used (in FIG. 1A, temporal 152B.1 and non-temporal 152B.2 are respectively specified for the memory access, temporal 125 instruction template and the memory access, non-temporal 130 instruction template), while the beta field 154 is interpreted as a data manipulation field 154C, whose content distinguishes which one of a number of data manipulation operations (also known as primitives) is to be performed (e.g., no manipulation; broadcast; up conversion of a source; and down conversion of a destination). The memory access 120 instruction templates include the scale field 160, and optionally the displacement field 162A or the displacement scale field 162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 152 is interpreted as a write mask control (Z) field 152C, whose content distinguishes whether the write masking controlled by the write mask field 170 should be a merging or a zeroing.

In the case of the non-memory access 105 instruction templates of class B, part of the beta field 154 is interpreted as an RL field 157A, whose content distinguishes which one of the different augmentation operation types are to be performed (e.g., round 157A.1 and vector length (VSIZE) 157A.2 are respectively specified for the no memory access, write mask control, partial round control type operation 112 instruction template and the no memory access, write mask control, VSIZE type operation 117 instruction template), while the rest of the beta field 154 distinguishes which of the operations of the specified type is to be performed. In the no memory access 105 instruction templates, the scale field 160, the displacement field 162A, and the displacement scale filed 162B are not present.

In the no memory access, write mask control, partial round control type operation 110 instruction template, the rest of the beta field 154 is interpreted as a round operation field 159A and exception event reporting is disabled (a given instruction does not report any kind of floating-point exception flag and does not raise any floating point exception handler).

Round operation control field 159A—just as round operation control field 158, its content distinguishes which one of a group of rounding operations to perform (e.g., Round-up, Round-down, Round-towards-zero and Round-to-nearest). Thus, the round operation control field 159A allows for the changing of the rounding mode on a per instruction basis. In one embodiment of the invention where a processor includes a control register for specifying rounding modes, the round operation control field's 150 content overrides that register value.

In the no memory access, write mask control, VSIZE type operation 117 instruction template, the rest of the beta field 154 is interpreted as a vector length field 159B, whose content distinguishes which one of a number of data vector lengths is to be performed on (e.g., 128, 256, or 512 byte).

In the case of a memory access 120 instruction template of class B, part of the beta field 154 is interpreted as a broadcast field 157B, whose content distinguishes whether or not the broadcast type data manipulation operation is to be performed, while the rest of the beta field 154 is interpreted the vector length field 159B. The memory access 120 instruction templates include the scale field 160, and optionally the displacement field 162A or the displacement scale field 162B.

With regard to the generic vector friendly instruction format 100, a full opcode field 174 is shown including the format field 140, the base operation field 142, and the data element width field 164. While one embodiment is shown where the full opcode field 174 includes all of these fields, the full opcode field 174 includes less than all of these fields in embodiments that do not support all of them. The full opcode field 174 provides the operation code (opcode).

The augmentation operation field 150, the data element width field 164, and the write mask field 170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

VEX Instruction Format

VEX encoding allows instructions to have more than two operands, and allows SIMD vector registers to be longer than 28 bits. The use of a VEX prefix provides for three-operand (or more) syntax. For example, previous two-operand instructions performed operations such as A=A+B, which overwrites a source operand. The use of a VEX prefix enables operands to perform nondestructive operations such as A=B+C.

FIG. 2A illustrates an exemplary AVX instruction format including a VEX prefix 202, real opcode field 230, Mod R/M byte 240, SIB byte 250, displacement field 262, and IMM8 272. FIG. 2B illustrates which fields from FIG. 2A make up a full opcode field 274 and a base operation field 241. FIG. 2C illustrates which fields from FIG. 2A make up a register index field 244.

VEX Prefix (Bytes 0-2) 202 is encoded in a three-byte form. The first byte is the Format Field 290 (VEX Byte 0, bits [7:0]), which contains an explicit C4 byte value (the unique value used for distinguishing the C4 instruction format). The second-third bytes (VEX Bytes 1-2) include a number of bit fields providing specific capability. Specifically, REX field 205 (VEX Byte 1, bits [7-5]) consists of a VEX.R bit field (VEX Byte 1, bit [7]-R), VEX.X bit field (VEX byte 1, bit [6]-X), and VEX.B bit field (VEX byte 1, bit[5]-B). Other fields of the instructions encode the lower three bits of the register indexes as is known in the art (rrr, xxx, and bbb), so that Rrrr, Xxxx, and Bbbb may be formed by adding VEX.R, VEX.X, and VEX.B. Opcode map field 215 (VEX byte 1, bits [4:0]-mmmmm) includes content to encode an implied leading opcode byte. W Field 264 (VEX byte 2, bit [7]-W)—is represented by the notation VEX.W, and provides different functions depending on the instruction. The role of VEX.vvvv 220 (VEX Byte 2, bits [6:3]-vvvv) may include the following: 1) VEX.vvvv encodes the first source register operand, specified in inverted (1 s complement) form and is valid for instructions with 2 or more source operands; 2) VEX.vvvv encodes the destination register operand, specified in 1 s complement form for certain vector shifts; or 3) VEX.vvvv does not encode any operand, the field is reserved and should contain 1111b. If VEX.L 268 Size field (VEX byte 2, bit [2]-L)=0, it indicates 28 bit vector; if VEX.L=1, it indicates 256 bit vector. Prefix encoding field 225 (VEX byte 2, bits [1:0]-pp) provides additional bits for the base operation field 241.

Real Opcode Field 230 (Byte 3) is also known as the opcode byte. Part of the opcode is specified in this field.

MOD R/M Field 240 (Byte 4) includes MOD field 242 (bits [7-6]), Reg field 244 (bits [5-3]), and R/M field 246 (bits [2-0]). The role of Reg field 244 may include the following: encoding either the destination register operand or a source register operand (the rrr of Rrrr), or be treated as an opcode extension and not used to encode any instruction operand. The role of R/M field 246 may include the following: encoding the instruction operand that references a memory address, or encoding either the destination register operand or a source register operand.

Scale, Index, Base (SIB)—The content of Scale field 250 (Byte 5) includes SS 252 (bits [7-6]), which is used for memory address generation. The contents of SIB.xxx 254 (bits [5-3]) and SIB.bbb 256 (bits [2-0]) have been previously referred to with regard to the register indexes Xxxx and Bbbb.

The Displacement Field 262 and the immediate field (IMM8) 272 contain data.

Exemplary Register Architecture

Figure 3:
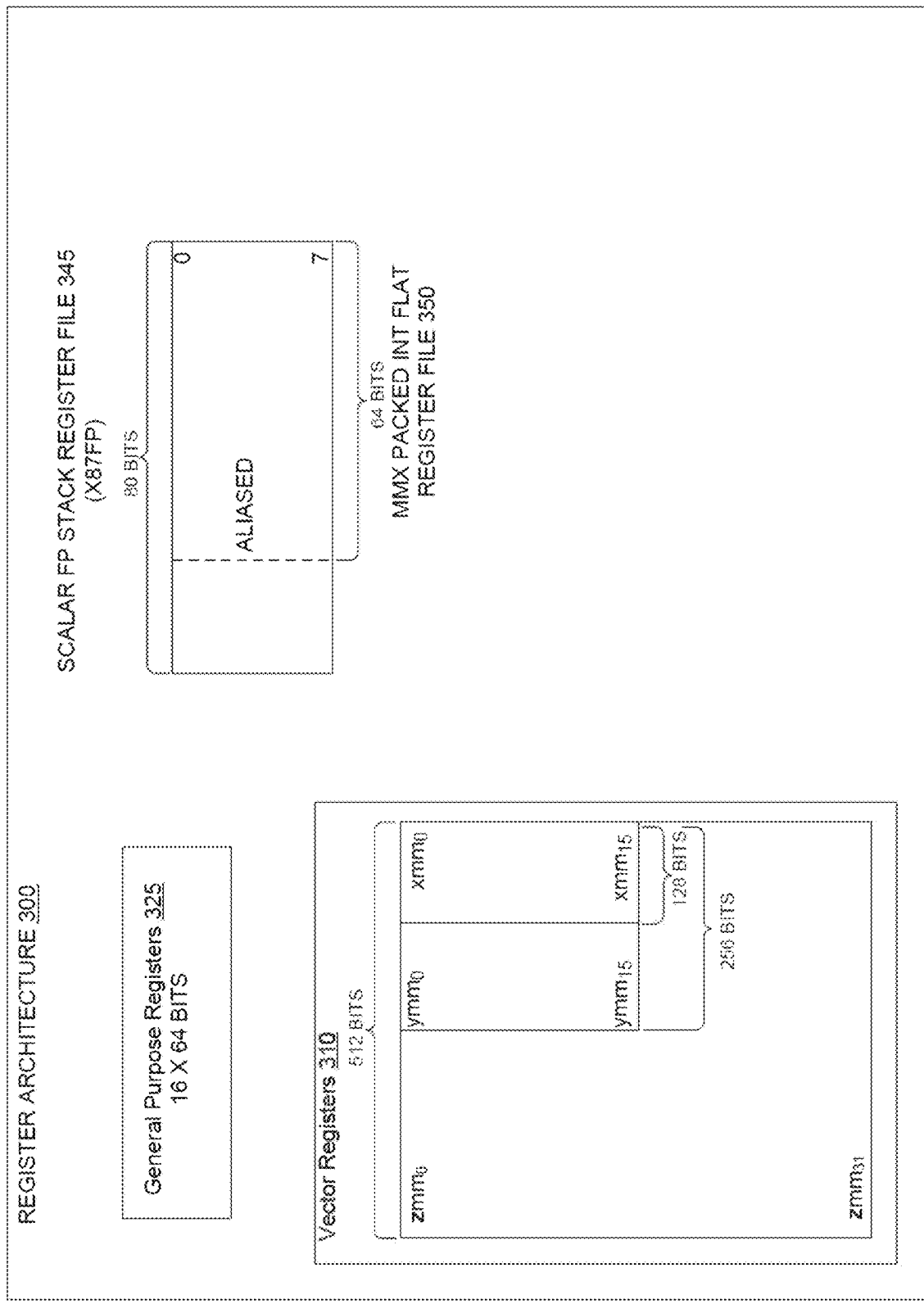
FIG. 3 is a block diagram of a register architecture according to one embodiment of the invention.

FIG. 3 is a block diagram of a register architecture 300 according to one embodiment of the invention. In the embodiment illustrated, there are 32 vector registers 310 that are 512 bits wide; these registers are referenced as zmm0 through zmm31. The lower order 256 bits of the lower 6 zmm registers are overlaid on registers ymm0-15. The lower order 128 bits of the lower 6 zmm registers (the lower order 128 bits of the ymm registers) are overlaid on registers xmm0-15.

General-purpose registers 325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 345, on which is aliased the MMX packed integer flat register file 350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures. Detailed herein are circuits (units) that comprise exemplary cores, processors, etc.

Exemplary Core Architectures

Figure 4A:
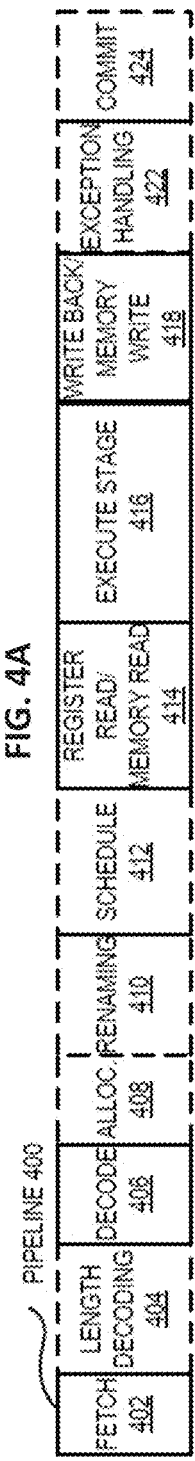
FIG. 4A is a block diagram illustrating both an exemplary in-order fetch, decode, retire pipeline and an exemplary register renaming, out-of-order issue/execution pipeline according to embodiments of the invention.
Figure 4B:
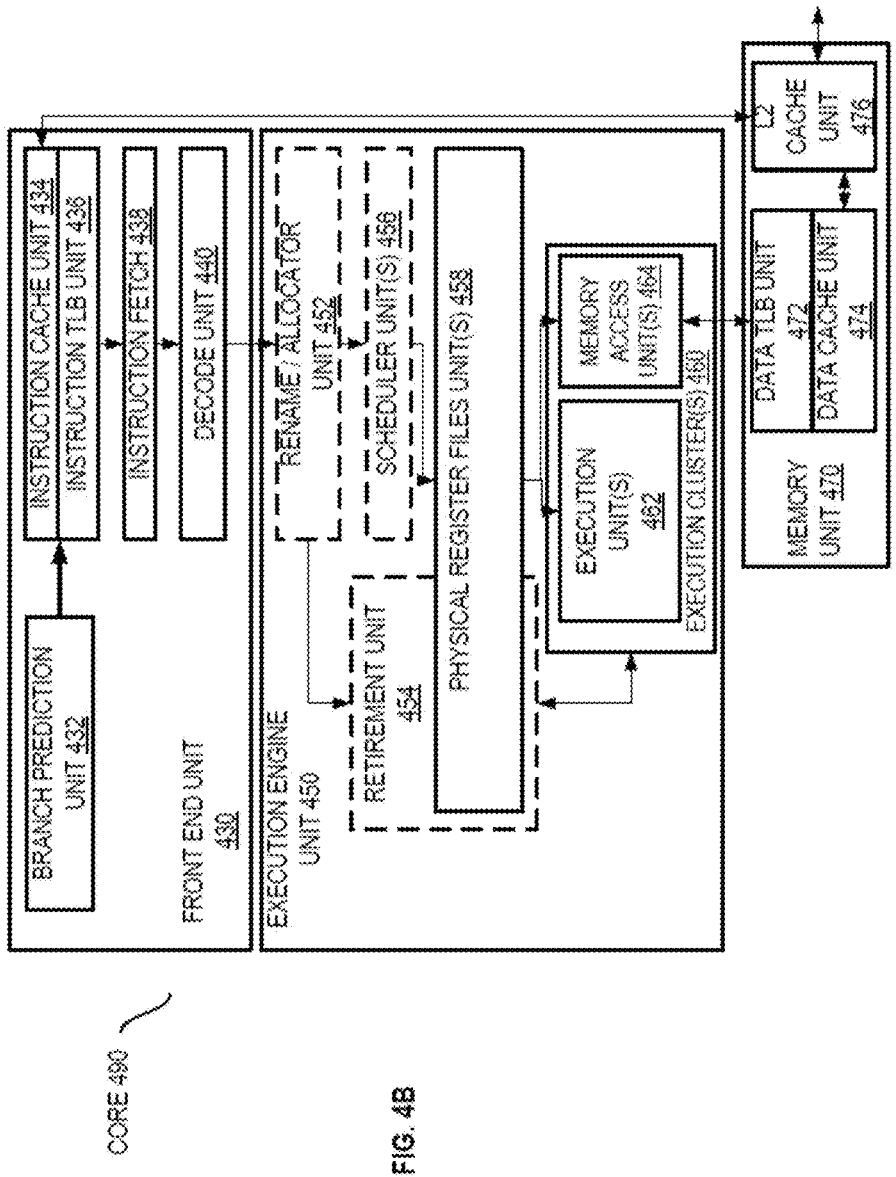
FIG. 4B is a block diagram illustrating both an exemplary embodiment of an in-order fetch, decode, retire core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/ execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432 coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 5B:
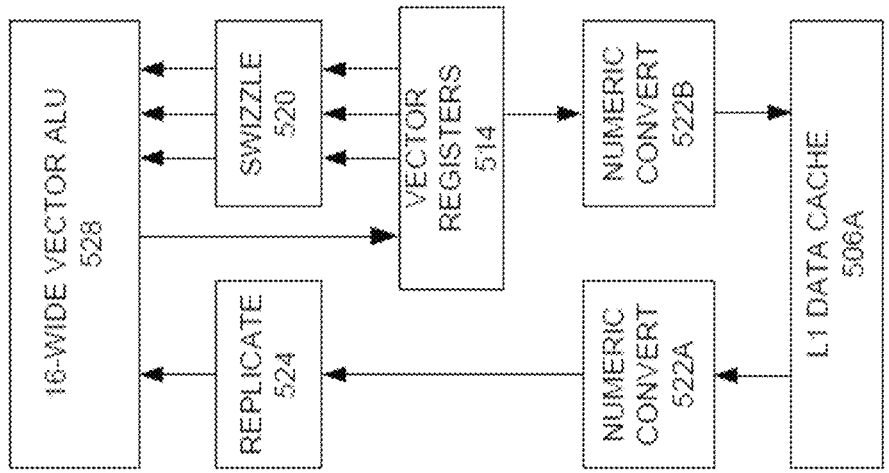
FIG. 5B illustrates an expanded view of part of the processor core in FIG. 5A according to embodiments of the invention.
Figure 5A:
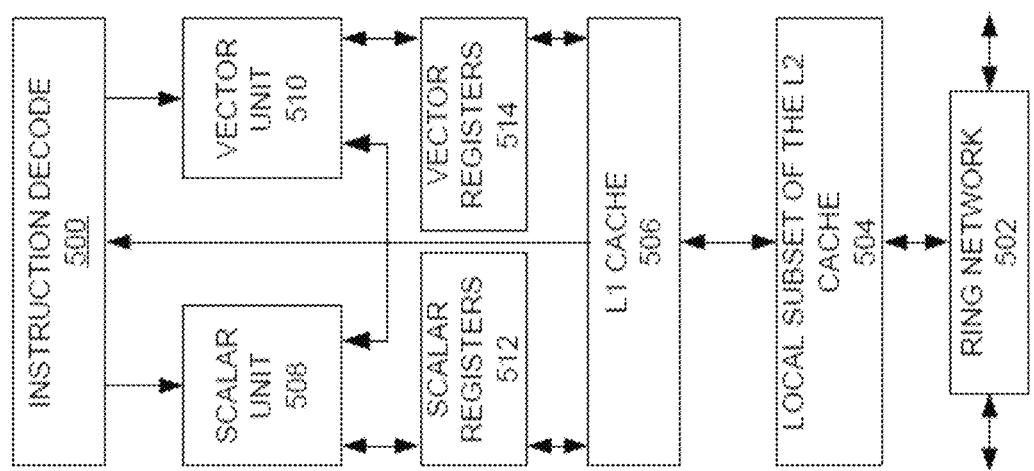
FIG. 5A is a block diagram of a single processor core, along with its connection to an on-die interconnect network.

FIGS. 5A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 5A is a block diagram of a single processor core, along with its connection to the on-die interconnect network 502 and with its local subset of the Level 2 (L2) cache 504, according to embodiments of the invention. In one embodiment, an instruction decoder 500 supports the x86 instruction set with a packed data instruction set extension. An L1 cache 506 allows low-latency accesses to cache memory into the scalar and vector units. While in one embodiment (to simplify the design), a scalar unit 508 and a vector unit 510 use separate register sets (respectively, scalar registers 512 and vector registers 514) and data transferred between them is written to memory and then read back in from a level 1 (L1) cache 506, alternative embodiments of the invention may use a different approach (e.g., use a single register set or include a communication path that allow data to be transferred between the two register files without being written and read back).

The local subset of the L2 cache 504 is part of a global L2 cache that is divided into separate local subsets, one per processor core. Each processor core has a direct access path to its own local subset of the L2 cache 504. Data read by a processor core is stored in its L2 cache subset 504 and can be accessed quickly, in parallel with other processor cores accessing their own local L2 cache subsets. Data written by a processor core is stored in its own L2 cache subset 504 and is flushed from other subsets, if necessary. The ring network ensures coherency for shared data. The ring network is bi-directional to allow agents such as processor cores, L2 caches and other logic blocks to communicate with each other within the chip. Each ring data-path is 1024-bits wide per direction in some embodiments.

FIG. 5B is an expanded view of part of the processor core in FIG. 5A according to embodiments of the invention. FIG. 5B includes an L1 data cache 506A part of the L1 cache 504, as well as more detail regarding the vector unit 510 and the vector registers 514. Specifically, the vector unit 510 is a 6-wide vector processing unit (VPU) (see the 16-wide ALU 528), which executes one or more of integer, single-precision float, and double-precision float instructions. The VPU supports swizzling the register inputs with swizzle unit 520, numeric conversion with numeric convert units 522A-B, and replication with replication unit 524 on the memory input.

Processor with Integrated Memory Controller and Graphics

Figure 6:
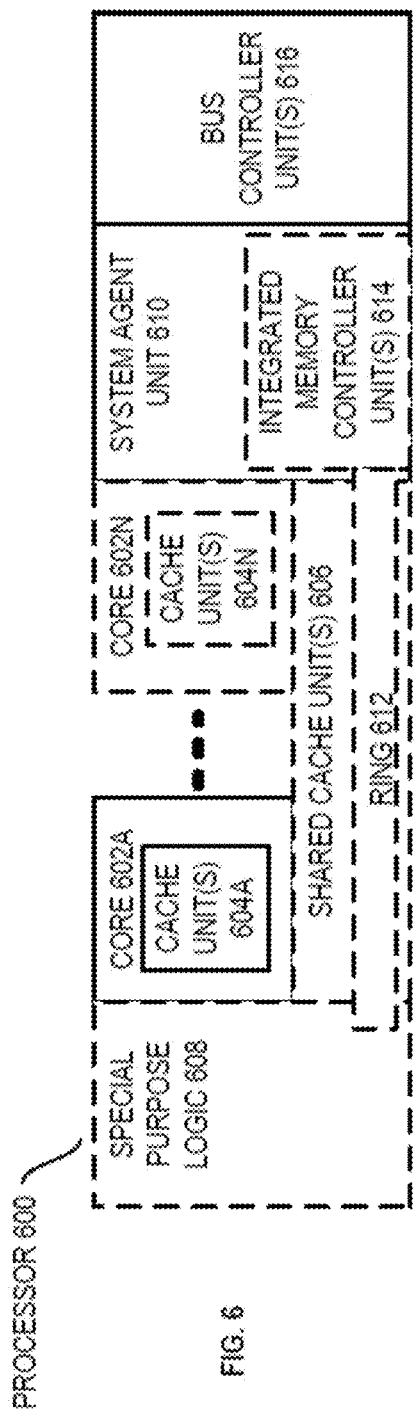
FIG. 6 is a block diagram of a single core processor and a multicore processor with integrated memory controller and graphics according to embodiments of the invention.

FIG. 6 is a block diagram of a processor 600 that may have more than one core, may have an integrated memory controller, and may have integrated graphics according to embodiments of the invention. The solid lined boxes in FIG. 6 illustrate a processor 600 with a single core 602A, a system agent 610, a set of one or more bus controller units 616, while the optional addition of the dashed lined boxes illustrates an alternative processor 600 with multiple cores 602A-N, a set of one or more integrated memory controller unit(s) 614 in the system agent unit 610, and special purpose logic 608.

Thus, different implementations of the processor 600 may include: 1) a CPU with the special purpose logic 608 being integrated graphics and/or scientific (throughput) logic (which may include one or more cores), and the cores 602A-N being one or more general purpose cores (e.g., general purpose in-order cores, general purpose out-of-order cores, a combination of the two); 2) a coprocessor with the cores 602A-N being a large number of special purpose cores intended primarily for graphics and/or scientific (throughput); and 3) a coprocessor with the cores 602A-N being a large number of general purpose in-order cores. Thus, the processor 600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 600 may be a part of and/or may be implemented on one or more substrates using any of a number of process technologies, such as, for example, BiCMOS, CMOS, or NMOS.

The memory hierarchy includes one or more levels of cache within the cores 604A-N, a set or one or more shared cache units 606, and external memory (not shown) coupled to the set of integrated memory controller units 614. The set of shared cache units 606 may include one or more mid-level caches, such as level 2 (L2), level 3 (L3), level 4 (L4), or other levels of cache, a last level cache (LLC), and/or combinations thereof. While in one embodiment a ring based interconnect unit 612 interconnects the integrated graphics logic 608, the set of shared cache units 606, and the system agent unit 610/integrated memory controller unit(s) 614, alternative embodiments may use any number of well-known techniques for interconnecting such units. In one embodiment, coherency is maintained between one or more cache units 606 and cores 602-A-N.

In some embodiments, one or more of the cores 602A-N are capable of multi-threading. The system agent 610 includes those components coordinating and operating cores 602A-N. The system agent unit 610 may include for example a power control unit (PCU) and a display unit. The PCU may be or include logic and components needed for regulating the power state of the cores 602A-N and the integrated graphics logic 608. The display unit is for driving one or more externally connected displays.

The cores 602A-N may be homogenous or heterogeneous in terms of architecture instruction set; that is, two or more of the cores 602A-N may be capable of execution the same instruction set, while others may be capable of executing only a subset of that instruction set or a different instruction set.

Exemplary Computer Architectures

FIGS. 7-10 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 7:
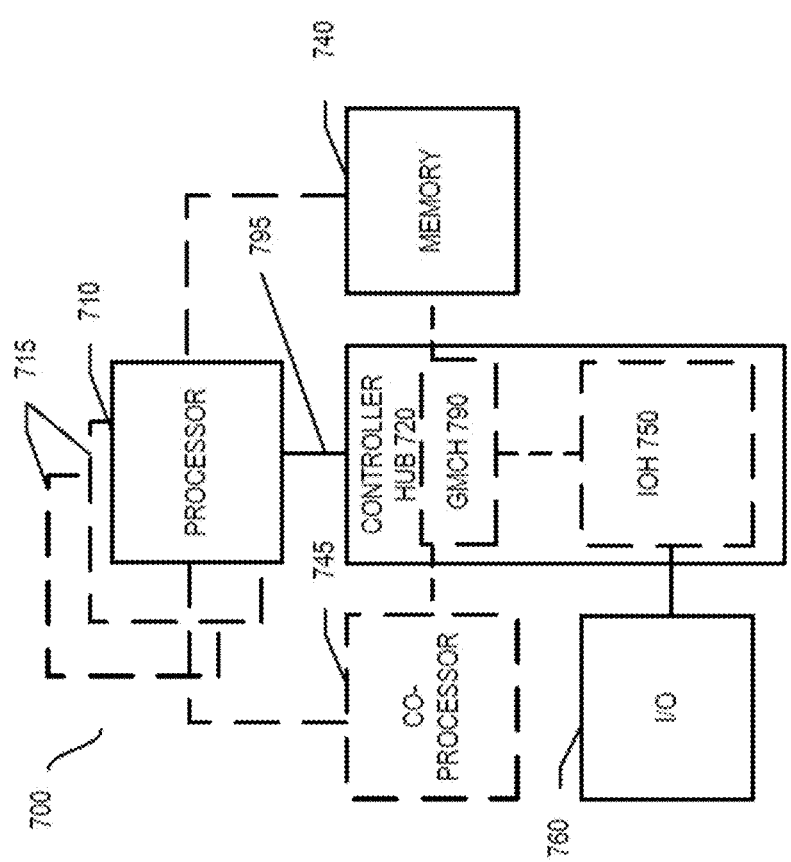
FIG. 7 illustrates a block diagram of a system in accordance with one embodiment of the present invention.

Referring now to FIG. 7, shown is a block diagram of a system 700 in accordance with one embodiment of the present invention. The system 700 may include one or more processors 710, 715, which are coupled to a controller hub 720. In one embodiment, the controller hub 720 includes a graphics memory controller hub (GMCH) 790 and an Input/Output Hub (IOH) 750 (which may be on separate chips); the GMCH 790 includes memory and graphics controllers to which are coupled memory 740 and a coprocessor 745; the IOH 750 is couples input/output (I/O) devices 760 to the GMCH 790. Alternatively, one or both of the memory and graphics controllers are integrated within the processor (as described herein), the memory 740 and the coprocessor 745 are coupled directly to the processor 710, and the controller hub 720 in a single chip with the IOH 750.

The optional nature of additional processors 715 is denoted in FIG. 7 with broken lines. Each processor 710, 715 may include one or more of the processing cores described herein and may be some version of the processor 600.

The memory 740 may be, for example, dynamic random access memory (DRAM), phase change memory (PCM), or a combination of the two. For at least one embodiment, the controller hub 720 communicates with the processor(s) 710, 715 via a multi-drop bus, such as a frontside bus (FSB), point-to-point interface, or similar connection 795.

In one embodiment, the coprocessor 745 is a special-purpose processor, such as, for example, a high-throughput MIC processor, a network or communication processor, compression engine, graphics processor, GPGPU, embedded processor, or the like. In one embodiment, controller hub 720 may include an integrated graphics accelerator.

There can be a variety of differences between the physical resources 710, 7155 in terms of a spectrum of metrics of merit including architectural, microarchitectural, thermal, power consumption characteristics, and the like.

In one embodiment, the processor 710 executes instructions that control data processing operations of a general type. Embedded within the instructions may be coprocessor instructions. The processor 710 recognizes these coprocessor instructions as being of a type that should be executed by the attached coprocessor 745. Accordingly, the processor 710 issues these coprocessor instructions (or control signals representing coprocessor instructions) on a coprocessor bus or other interconnect, to coprocessor 745. Coprocessor(s) 745 accept and execute the received coprocessor instructions.

Figure 8:
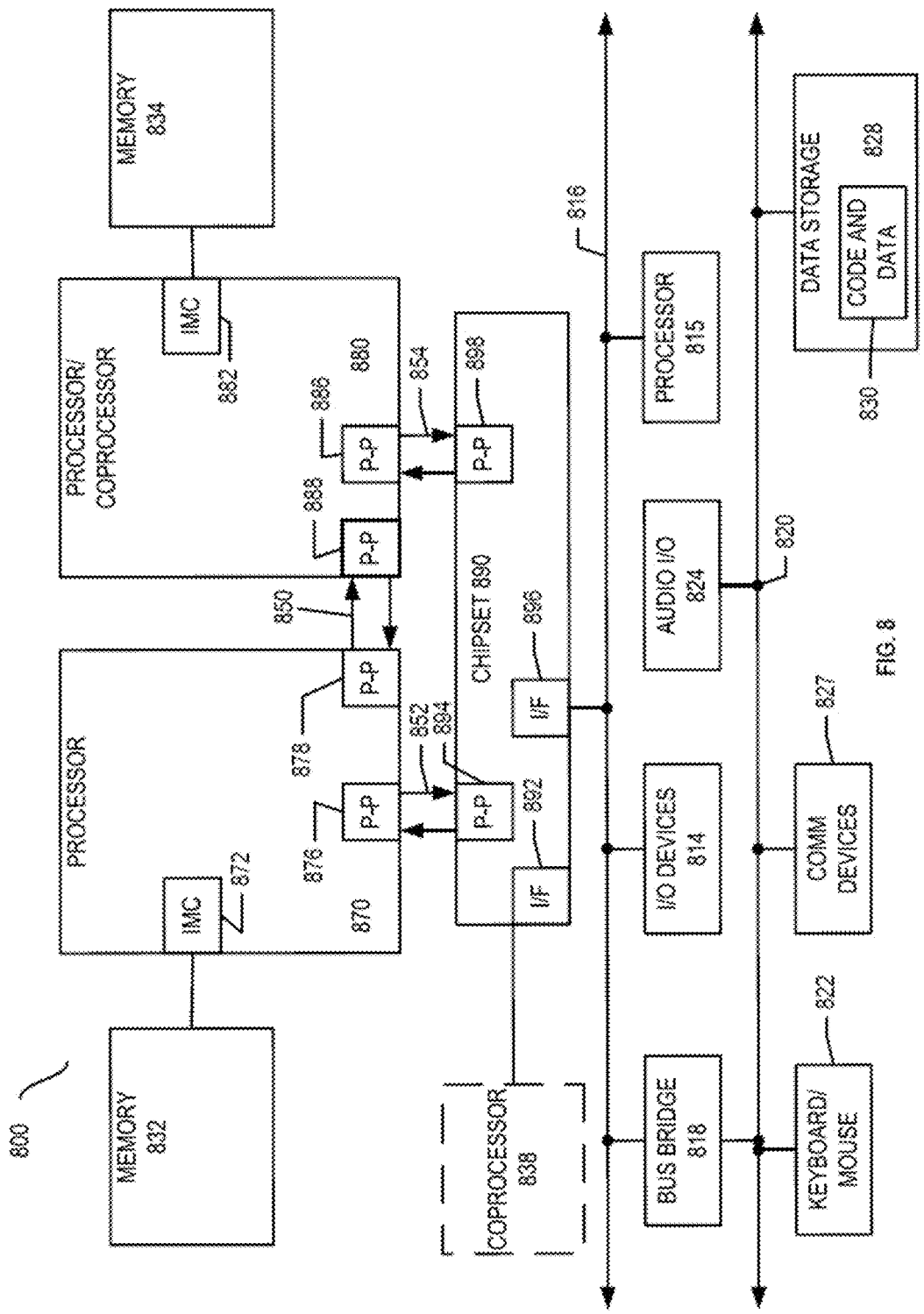
FIG. 8 illustrates a block diagram of a second system in accordance with an embodiment of the present invention.

Referring now to FIG. 8, shown is a block diagram of a first more specific exemplary system 800 in accordance with an embodiment of the present invention. As shown in FIG. 8, multiprocessor system 800 is a point-to-point interconnect system, and includes a first processor 870 and a second processor 880 coupled via a point-to-point interconnect 850. Each of processors 870 and 880 may be some version of the processor 600. In one embodiment of the invention, processors 870 and 880 are respectively processors 710 and 715, while coprocessor 838 is coprocessor 745. In another embodiment, processors 870 and 880 are respectively processor 710 coprocessor 745.

Processors 870 and 880 are shown including integrated memory controller (IMC) units 872 and 882, respectively. Processor 870 also includes as part of its bus controller units point-to-point (P-P) interfaces 876 and 878; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may each exchange information with a chipset 890 via individual P-P interfaces 852, 854 using point to point interface circuits 876, 894, 886, 898. Chipset 890 may optionally exchange information with the coprocessor 838 via a high-performance interface 892. In one embodiment, the coprocessor 838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 890 may be coupled to a first bus 816 via an interface 896. In one embodiment, first bus 816 may be a Peripheral Component Interconnect (PCI) bus, or a bus such as a PCI Express bus or another I/O interconnect bus, although the scope of the present invention is not so limited.

As shown in FIG. 8, various I/O devices 814 may be coupled to first bus 816, along with a bus bridge 818 which couples first bus 816 to a second bus 820. In one embodiment, one or more additional processor(s) 815, such as coprocessors, high-throughput MIC processors, GPGPU's, accelerators (such as, e.g., graphics accelerators or digital signal processing (DSP) units), field programmable gate arrays, or any other processor, are coupled to first bus 816. In one embodiment, second bus 820 may be a low pin count (LPC) bus. Various devices may be coupled to a second bus 820 including, for example, a keyboard and/or mouse 822, communication devices 827 and a storage unit 828 such as a disk drive or other mass storage device which may include instructions/code and data 830, in one embodiment. Further, an audio I/O 824 may be coupled to the second bus 816. Note that other architectures are possible. For example, instead of the point-to-point architecture of FIG. 8, a system may implement a multi-drop bus or other such architecture.

Figure 9:
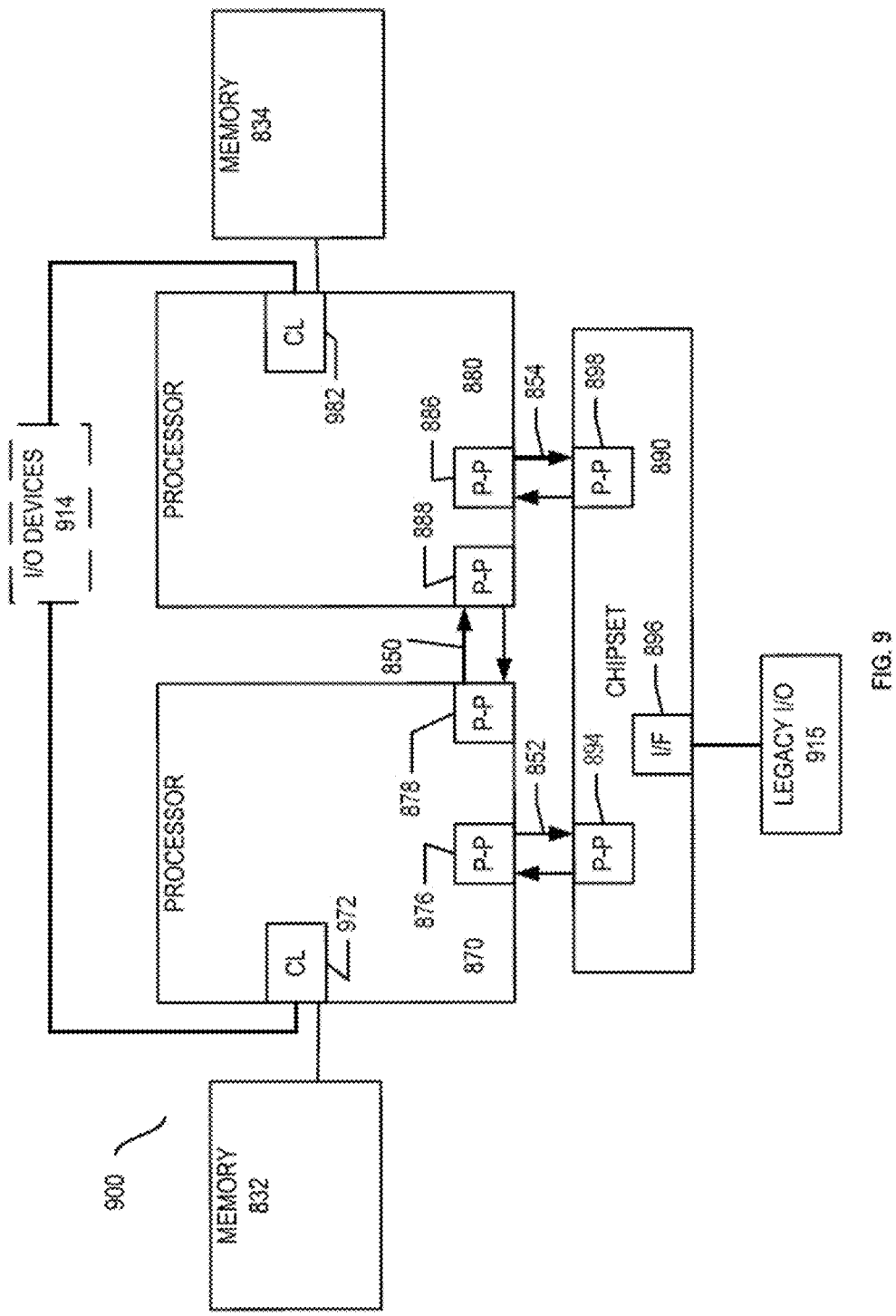
FIG. 9 illustrates a block diagram of a third system in accordance with an embodiment of the present invention.

Referring now to FIG. 9, shown is a block diagram of a second more specific exemplary system 900 in accordance with an embodiment of the present invention. Like elements in FIGS. 8 and 9 bear like reference numerals, and certain aspects of FIG. 8 have been omitted from FIG. 9 in order to avoid obscuring other aspects of FIG. 9.

FIG. 9 illustrates that the processors 870, 880 may include integrated memory and I/O control logic ("CL") 972 and 982, respectively. Thus, the CL 972, 982 include integrated memory controller units and include I/O control logic. FIG. 9 illustrates that not only are the memories 832, 834 coupled to the CL 872, 882, but also that I/O devices 914 are also coupled to the control logic 872, 882. Legacy I/O devices 915 are coupled to the chipset 890.

Figure 10:
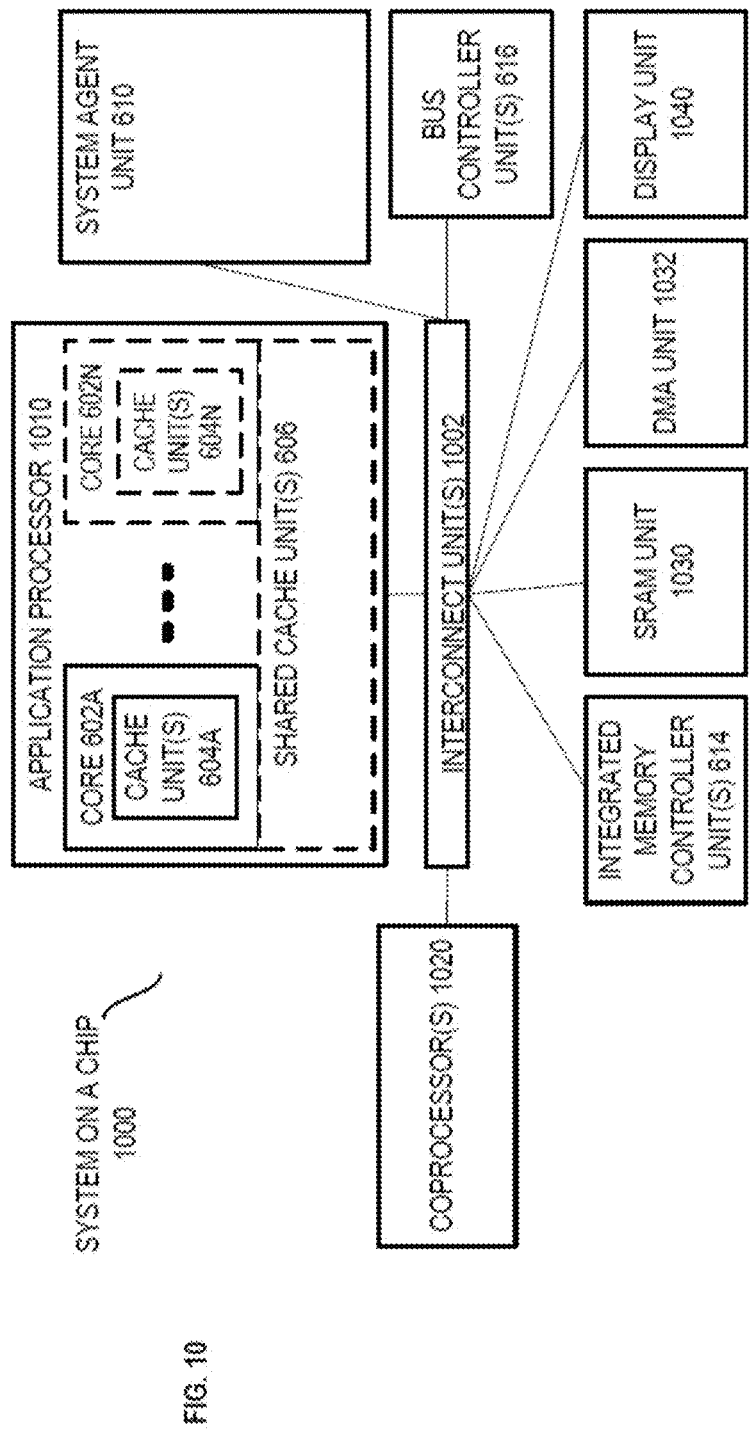
FIG. 10 illustrates a block diagram of a system on a chip (SoC) in accordance with an embodiment of the present invention.

Referring now to FIG. 10, shown is a block diagram of a SoC 1000 in accordance with an embodiment of the present invention. Similar elements in FIG. 6 bear like reference numerals. Also, dashed lined boxes are optional features on more advanced SoCs. In FIG. 10, an interconnect unit(s) 1002 is coupled to: an application processor 1010 which includes a set of one or more cores 102A-N, cache units 604A-N, and shared cache unit(s) 606; a system agent unit 610; a bus controller unit(s) 616; an integrated memory controller unit(s) 614; a set or one or more coprocessors 1020 which may include integrated graphics logic, an image processor, an audio processor, and a video processor; an static random access memory (SRAM) unit 1030; a direct memory access (DMA) unit 1032; and a display unit 1040 for coupling to one or more external displays. In one embodiment, the coprocessor(s) 1020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 830 illustrated in FIG. 8, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 11:
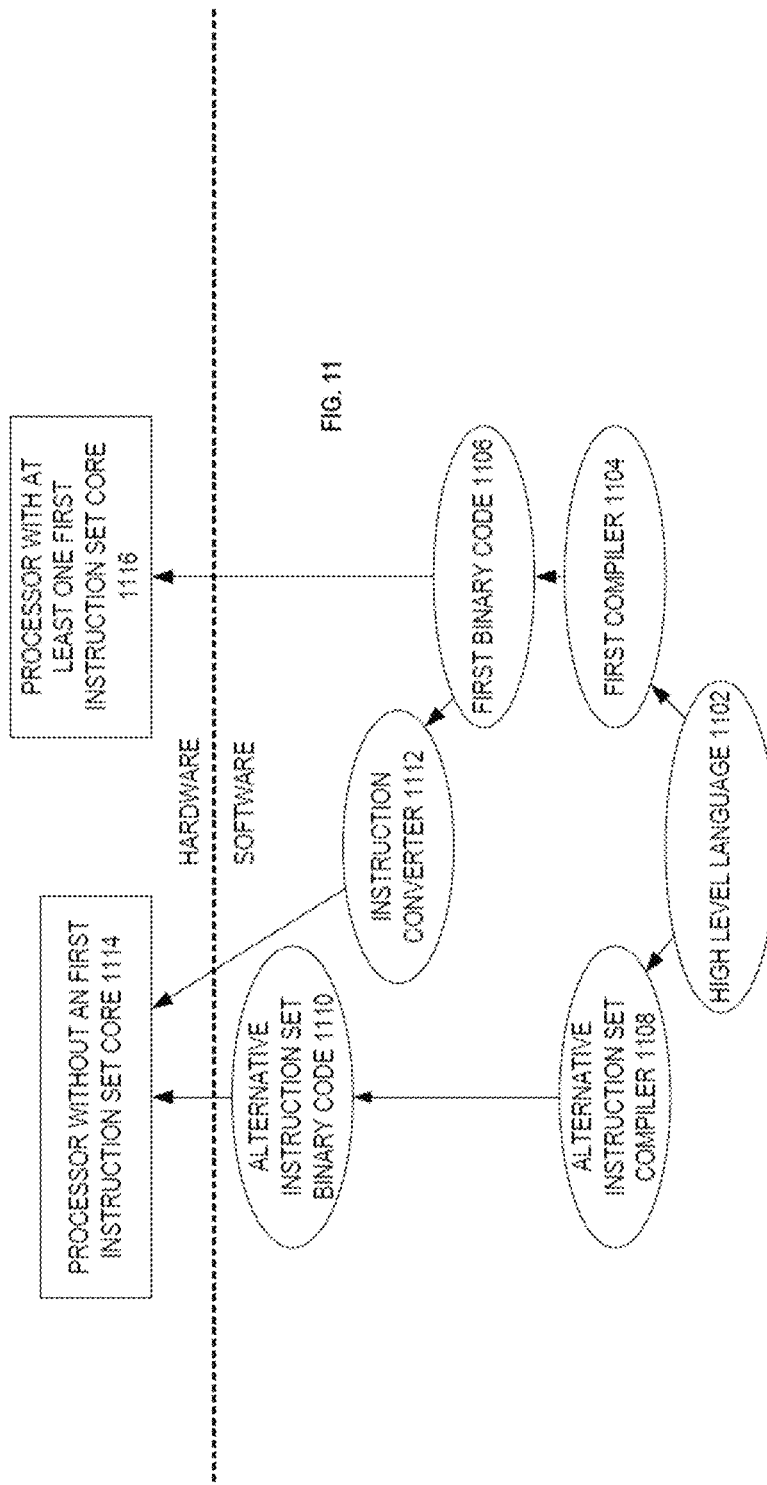
FIG. 11 illustrates a block diagram contrasting the use of a software instruction converter to convert binary instructions in a source instruction set to binary instructions in a target instruction set according to embodiments of the invention.

FIG. 11 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 11 shows a program in a high level language 1102 may be compiled using an first compiler 1104 to generate a first binary code (e.g., x86) 1106 that may be natively executed by a processor with at least one first instruction set core 1116. In some embodiments, the processor with at least one first instruction set core 1116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The first compiler 1104 represents a compiler that is operable to generate binary code of the first instruction set 1106 (e.g., object code) that can, with or without additional linkage processing, be executed on the processor with at least one first instruction set core 1116. Similarly, FIG. 11 shows the program in the high level language 1102 may be compiled using an alternative instruction set compiler 1108 to generate alternative instruction set binary code 1110 that may be natively executed by a processor without at least one first instruction set core 1114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1112 is used to convert the first binary code 1106 into code that may be natively executed by the processor without an first instruction set core 1114. This converted code is not likely to be the same as the alternative instruction set binary code 1110 because an instruction converter capable of this is difficult to make; however, the converted code will accomplish the general operation and be made up of instructions from the alternative instruction set. Thus, the instruction converter 1112 represents software, firmware, hardware, or a combination thereof that, through emulation, simulation or any other process, allows a processor or other electronic device that does not have a first instruction set processor or core to execute the first binary code 1106.

Memory Management Apparatus and Method for Compartmentalization Using Linear Address Metadata Software is becoming increasingly complex, with different components, functionalities, and security boundaries. In particular, the model of well-defined boundaries is often implemented for security, to isolate different components of an application. From a hardware perspective, however, an entire application is in one process address space. Consequently, there is no memory isolation between components and a security bug (such as an exploitable memory corruption) in one component can lead to the entire application being compromised. Software vendors have attempted to mitigate this issue by placing these components in different processes. While process isolation provides a natural defense, it results in added memory overhead, performance impacts in terms of latency and responsiveness, and potentially increased power usage.

1. Page Table Extensions

One embodiment of the invention comprises circuitry and/or software to extend existing page table lookups with an additional page walk which associates additional metadata (tags) with linear addresses. The additional page walk may be performed at various levels of granularity (e.g., 4K, 2M, 1G, 512G, etc). In addition, one embodiment includes a sandbox instruction set architecture (ISA) in which a software component is assigned a sandbox ID. The processor then ensures that all memory access tags in use match the current sandbox ID. If a match is not found, then the processor may raise a fault and/or take other corrective security measures. These implementations are used to implement hardware-enforced memory isolation between independent software components of an application which reside in the same address space.

Page tables are set up by the operating system and used by hardware to translate virtual/linear addresses to physical addresses. Modern processors have run out of available bits in page table entries, largely because the available bits are being used by modern operating systems to store additional information.

The embodiments of the invention may be implemented with different page table arrangements and address translation architectures including, but not limited to, those which use 4-level paging and 5-level paging. By way of example, and not limitation, FIG. 12 illustrates an example of a 4-level paging architecture and FIG. 13 illustrates an example of a 5-level paging architecture.

Figure 12:
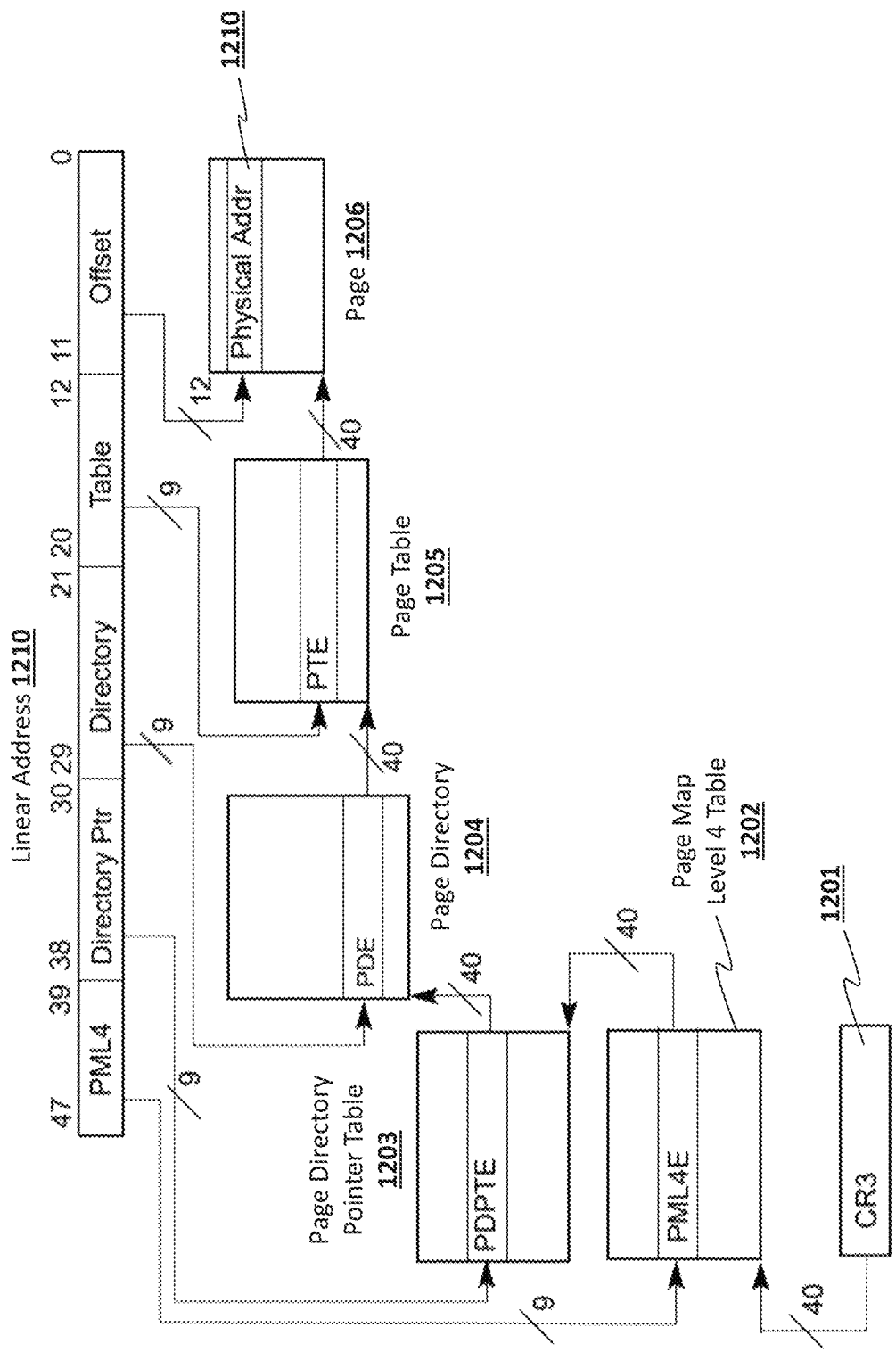
FIGS. 12-13 illustrate two different types of page table lookups.

In FIG. 12, control register CR3 1201 stores the base address of a page map level 4 (PML4) table 1202. The address translation circuitry 1280 uses this value and bits 47:39 of the virtual/linear address 1210 to identify an entry which identifies the base of a page directory pointer table 1203 in which an entry is identified using directory pointer bits 38:30 of the virtual/linear address 1210. The entry from the PDPT 1203 points to the base of a page directory 1204 and directory bits 29:21 from the virtual/linear address 1210 identify a page directory entry (PDE) pointing to the base of a page table 1205. Table bits 20:12 identify a page table entry (PTE) which points to the base of page 1206 and a particular physical address 1210 is identified using offset bits 11:0 from the virtual/linear address 1210.

Access to the final physical page is subject to permission and fault checking mechanisms. If permission checks allow access to the page, then a translation lookaside buffer (TLB) is filled with the virtual to physical mapping so that a subsequent page walk operation is not required.

Figure 13:
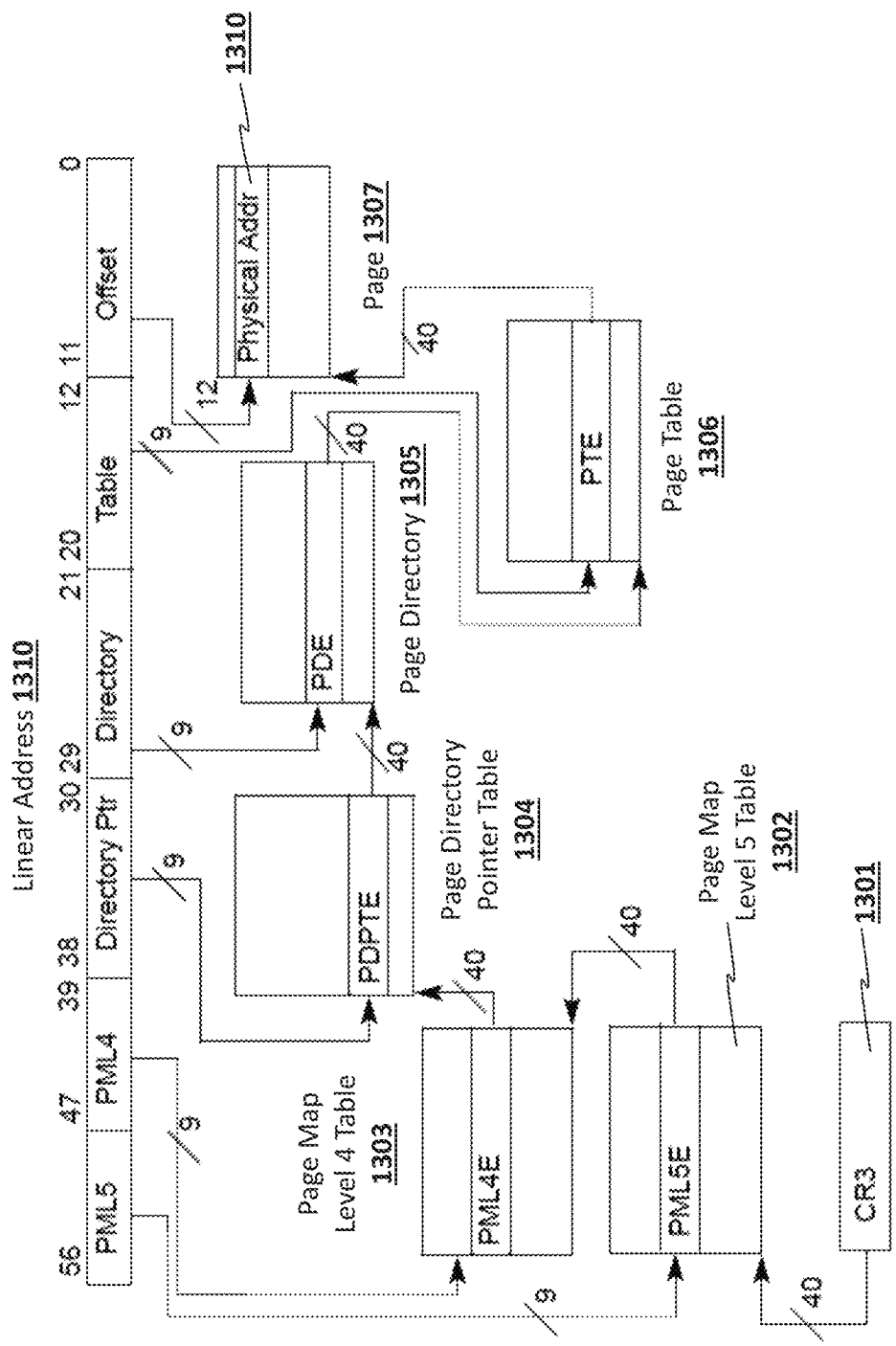

The 5-level paging implementation in FIG. 13 operates in substantially the same manner except that the value in control register CR3 points to a page map level 5 (PML5) table and PML5 bits 56:48 of the virtual/linear address identify a PML5 entry pointing to the base of the PML4 table 1303. The page directory pointer table 1304, page directory 1305, page table 1306, and page 1307 containing the physical address 1310 are accessed in a similar manner as described above.

One embodiment of the invention extends standard page tables in an orthogonal manner without changing current formatting of page table entries. These page table extensions allow the processor to associate additional metadata with virtual/linear addresses and thus provide additional functionality, such as additional security checks.

In one implementation, page walks are supplemented with a parallel table, referred to herein as a linear address tag table (LATT) in the physical address space which is used for tagging of linear addresses. The parallel table may be indexed using the same set of linear address bits as the standard page table and the tags may be implemented at various levels of granularity, which may or may not correspond to the granularity used by the standard page table. By way of example, and not limitation, the tags may be implemented at a granularity of 4K, 2M, 1G, or 512G.

The LATT does not resolve linear-to-physical translations nor does it resolve page table permission information. Instead, it allows the processor to associate additional metadata (e.g., 16-bit tags) with linear addresses. In one embodiment, the LATT differs from a normal page table in that it is a sparse table and thus has a reduced memory commitment compared to the normal page tables.

Figure 14:
FIG. 14 illustrates one embodiment of a linear address tag table (LATT) entry.

In one embodiment, a LATT page walk can terminate at any level without causing a fault. For example, it may terminate at a PML4E level (or equivalent level) and associate a tag with an entire 512G linear address range. One embodiment of a format of a non-leaf LATT paging structure 1400, illustrated in FIG. 14, includes the following bit definitions:

Bit 1 (Rsvd)→Reserved bit. Should always be cleared.
Bit 2 (Rsvd)→Reserved bit. Should always be cleared.
Bit 3-18 (CompId)→16 bit tag associated with this address.
Bit 19-M+5 (LowerTabPA)→Page frame number of next LATT paging structure. If it is a leaf entry, then this field becomes reserved.
Bits M+6-63→Reserved bit. Should always be cleared.
M→Maximum Physical Address Width.

Figure 15A:
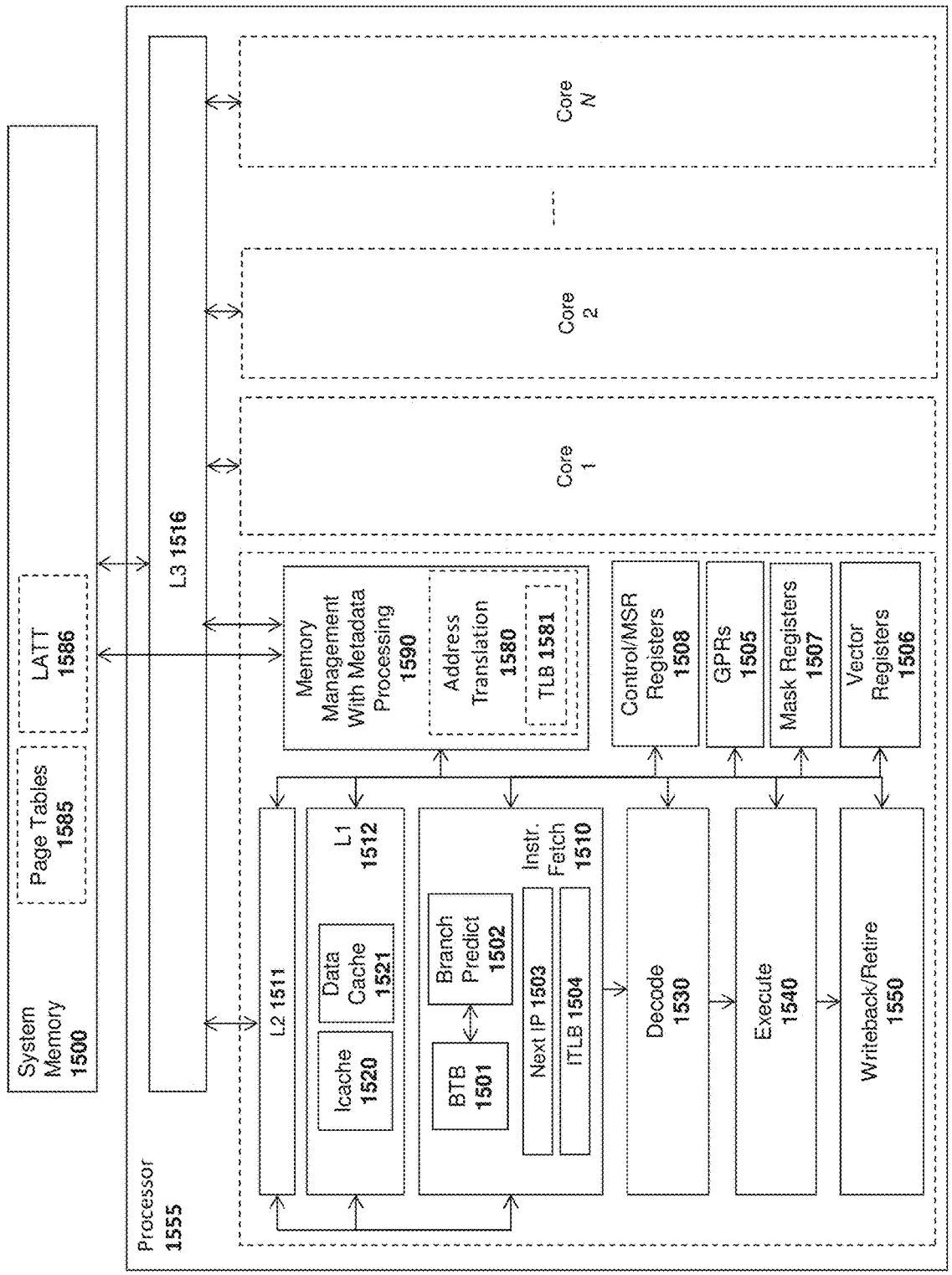
FIGS. 15A-B illustrate different processor architectures on which embodiments of the invention may be implemented.

FIG. 15A illustrates an exemplary processor 1555 on which embodiments of the invention may be implemented including a plurality of cores 0-N for simultaneously executing a plurality of instruction threads. While details of only a single core (Core 0) are shown in FIG. 15A, it will be understood that each of the other cores of processor 1555 may include the same or similar components.

The plurality of cores 0-N may each include a memory management unit (MMU) with metadata processing circuitry/logic 1590 for performing memory operations (e.g., such as load/store operations) and LATT processing operations using the techniques described herein. For example, address translation circuitry 1580 of the MMU 1590 may implement the LATT address translation techniques to allow the core to access page tables 1585 and corresponding LATTs 1586 in memory 1500 and to validate the tags associated with page table entries.

In one embodiment, in response to an address translation request comprising a virtual address, the address translation circuitry 1580 accesses the appropriate set of page table entries in system memory 1585 to identify the physical memory address associated with the virtual address. The address translation circuitry 1580 concurrently identifies corresponding metadata from the LATT 1586 associated with the virtual address. It may then validate by comparing the tag in the LATT with a value in a control register associated with the memory region (as described below). If validation succeeds, it may then cache the results in a translation lookaside buffer (TLB) 1581 so that it will be available for subsequent address translation requests. The results cached in the TLB 1581 may include data from both the page table entry and the corresponding LATT entry.

The illustrated architecture also includes an execution pipeline which uses the address translations including an instruction fetch unit 1510 for fetching instructions from system memory 1500, the level 1 (L1) instruction cache 1520, the L2 cache 1511, or the L3 cache 1516. The instruction fetch unit 1510 also includes a next instruction pointer 1503 for storing the address of the next instruction to be fetched from memory 1500 (or one of the caches); an instruction translation look-aside buffer (ITLB) 1504 for storing a map of recently used virtual-to-physical instruction address translations to improve the speed of address translation; a branch prediction unit 1502 for speculatively predicting instruction branch addresses; and branch target buffers (BTBs) 1501 for storing branch addresses and target addresses.

A decoder 1530 decodes the fetched instructions into micro-operations or "uops" and an execution unit 1540 executing the uops on a plurality of functional units. A writeback/retirement unit 1550 retires the executed instructions and writes back the results to other elements of the execution pipeline.

The illustrated core architecture also includes a set of general purpose registers (GPRs) 1505, a set of vector registers 1506, and a set of mask registers 1507. In one embodiment, multiple vector data elements are packed into each vector register 1506 which may have a 512 bit width for storing two 256 bit values, four 128 bit values, eight 64 bit values, sixteen 32 bit values, etc. However, the underlying principles of the invention are not limited to any particular size/type of vector data. In one embodiment, the mask registers 1507 include eight 64-bit operand mask registers used for performing bit masking operations on the values stored in the vector registers 1506 (e.g., implemented as mask registers k0-k7 described herein). However, the underlying principles of the invention are not limited to any particular mask register size/type.

Each core 0-N may include a dedicated Level 1 (L1) cache 1512 and Level 2 (L2) cache 1511 for caching instructions and data according to a specified cache management policy. As mentioned, the L1 cache 1512 includes a separate instruction cache 1520 for storing instructions and a separate data cache 1521 for storing data. The instructions and data stored within the various processor caches are managed at the granularity of cache lines which may be a fixed size (e.g., 64, 128, 512 Bytes in length).

Figure 15B:
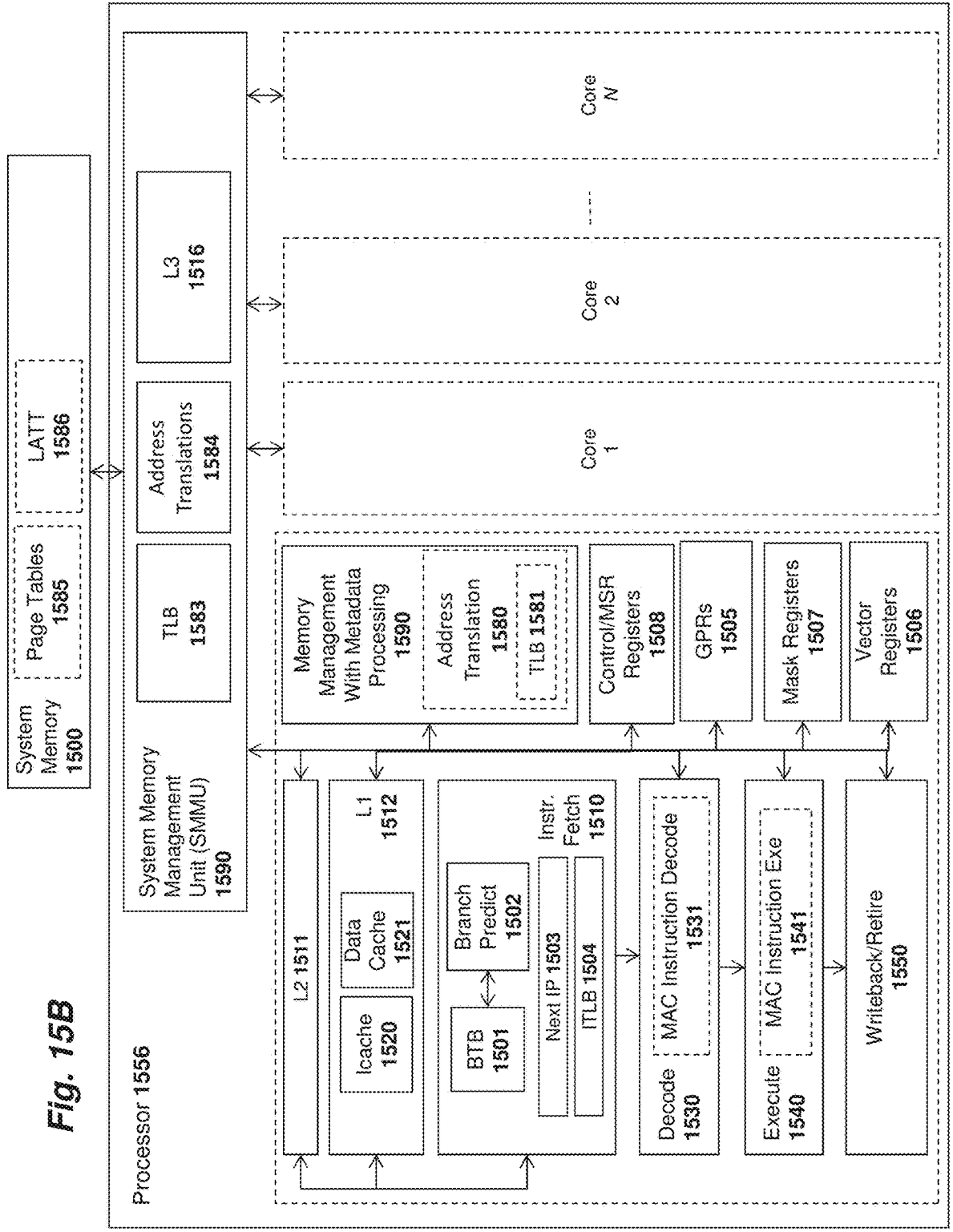

FIG. 15B illustrates an embodiment which includes a system memory management unit (SMMU) 1590 for performing system-level memory management operations on behalf of all of the cores and any other system-level components such as a graphics processor, digital signal processor (DSP), and/or PCIe device. The SMMU 1590 includes an L3 cache 1516, address translation circuitry 1584 for performing virtual-to-physical address translations, and a TLB 1583 for caching the address translations, which may be synchronized with the address translations in the TLBs 1581 of each core. While illustrated within processor 1556, the SMMU may be on a different chip from the processor 1556. The address translation circuitry 1584 of the SMMU 1590 may also perform the tag-based memory management techniques described herein.

Figure 16A:
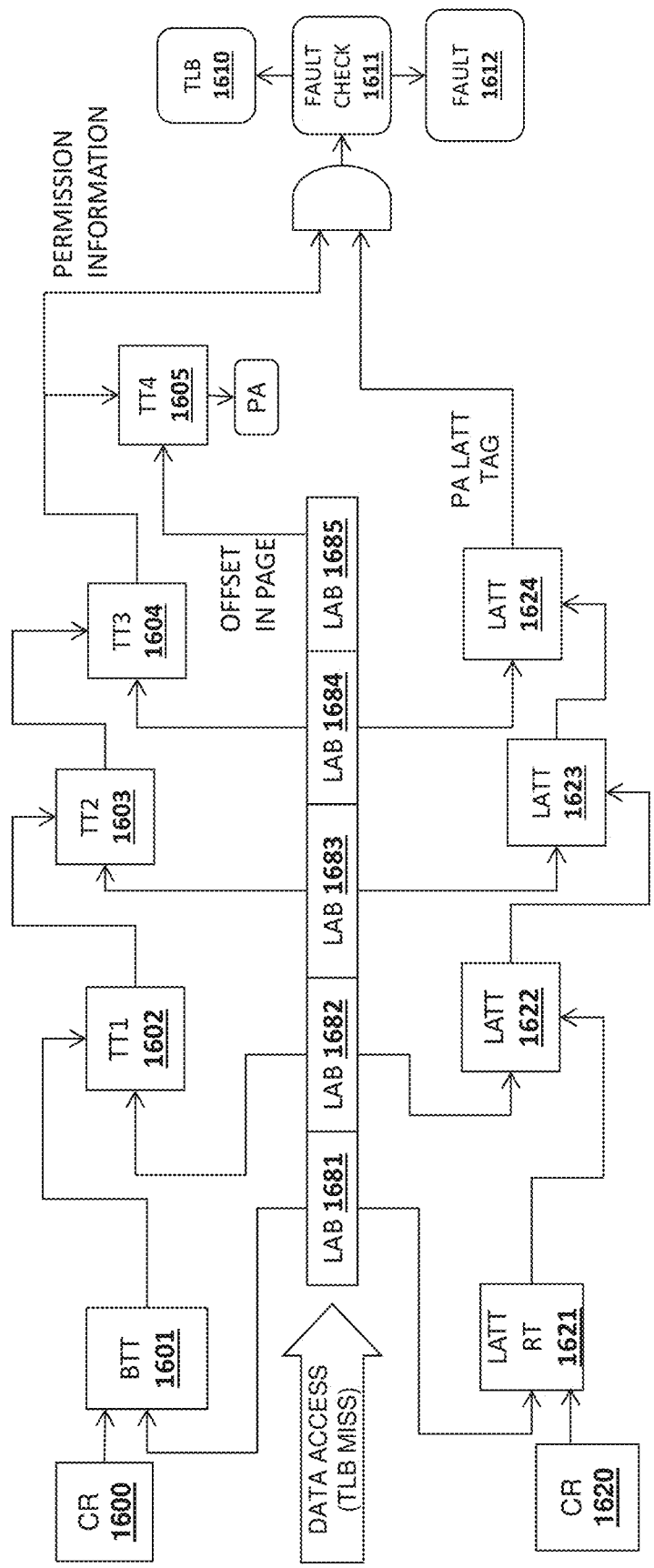
FIGS. 16A-B illustrate a lookup in a linear address tag table (LATT) in parallel with a page table lookup.

FIG. 16A illustrates parallel table lookups performed in a set of address translation tables 1601-1605 and linear address tag tables (LATTs) 1621-1624. As mentioned, a control register 1600 stores a pointer to the base address of a base translation table 1601 which is combined with a set of linear address bits (LAB) from the virtual address to identify an entry. Each successive level of the translation operation combines the next set of linear address bits 1682-1685 with the output of the prior translation 1602-1605 to ultimately generate a physical address (PA).

In a similar manner, a control register 1620 stores the base address of a LATT root table 1621 which is combined with the first set of linear address bits 1681 to identify a root table entry. The address bits from the root entry are combined with the next set of linear address bits 1682 to identify the next LATT table 1622. Each successive level of the LATT operation combines the next set of linear address bits 1683-1685 with the output of the prior LATT table 1623-1624 to generate a LATT tag value.

Permission information from the final page table 1605 is routed to fault check logic 1611 which selectively detects fault conditions, potentially resulting in a fill to the TLB 1610 (e.g., if the permission check and/or tag comparison are validated) and/or generation of a fault condition 1612 (e.g., if the tag from the LATT does not match a tag value associated with the memory region and/or the requestor does not have sufficient permission to access the memory region). Faults may also be generated based on the contents of TLB entries even without performing a page walk at the time that the fault is generated. For example, if a TLB entry exists for the requested page with a mismatched CID value, this would generate a fault. However, as mentioned, a fault does not need to be generated for early termination of a LATT page walk.

Figure 16B:
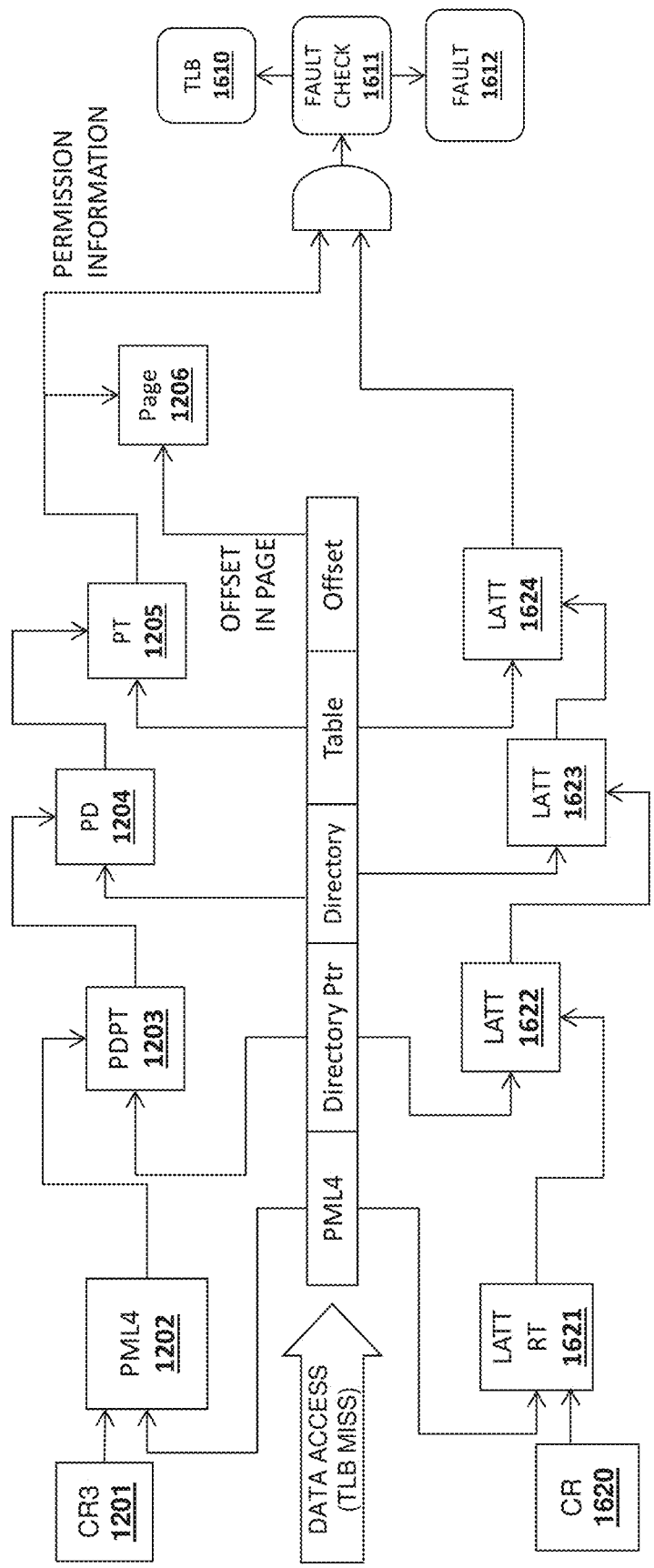

FIG. 16B illustrates a specific example in which LATT lookups are performed in parallel with the PML4 paging architecture from FIG. 12. As previously described, control register CR3 1201 stores a pointer to the base address of a PML4 table 1202 and PML4 linear address bits identify an entry within the PML4 table which points to a page directory pointer table (PDPT) 1203. The directory pointer linear address bits identify an entry in the PDPT 1203 which points to a page directory (PD) table 1204. The directory address bits identify an entry in the PD table 1204 with a pointer to page table 1205. The table bits identify an entry in the page table 1205 which identifies a page 1206. Finally, offset bits in the linear address identify an offset into the page 1206 to identify an entry containing the corresponding physical address and associated permission information.

The tag lookup operations are performed in parallel with the PML4 lookup. In particular, the control register 1620 stores a pointer to the base address of the LATT root table

1621. The PML4 address bits provide an offset to identify an entry in the LATT RT which includes a pointer to the next level LATT 1622. The directory pointer address bits provide an offset in LATT 1622 to identify an entry which points to the next level LATT 1623. The directory bits point to an entry in LATT 1623 which points to the final level LATT 1624. The table linear address bits then identify an entry within LATT 1624 which includes a LATT tag value.

While the architectures described above include specific numbers of translation table stages, the underlying principles of the invention are not limited to these particular implementations. Various different page table architectures and lookup mechanisms may be used with the LATT lookup and management techniques described herein. For example, in one implementation, the LATT comprises a single level table with a sufficiently large granularity to identify linear addresses for the entire system memory. Alternatively, any number of table levels may be used.

Figure 17:
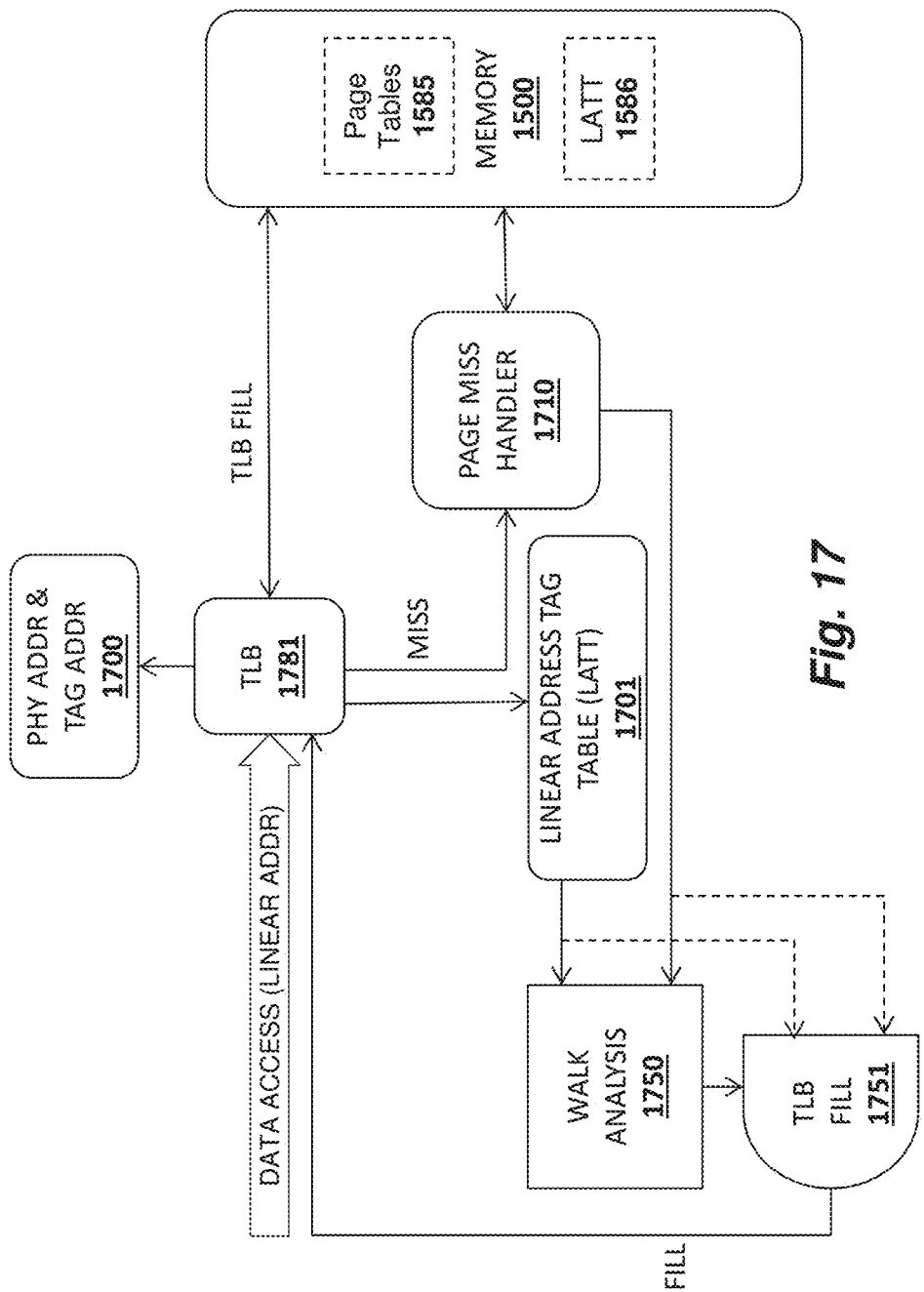
FIG. 17 illustrates one embodiment of an architecture for evaluating page table entries using tags.

Referring to FIG. 17, the following sequence of operations may be performed in one embodiment. On a data access, the TLB 1781 is checked for an entry associated with the linear address. If one is found, then the corresponding physical page address and associated LATT tag value 1700 are returned. That is, in the case of a hit, the LATT tag value is already cached in the TLB entry.

In response to a TLB miss, the processor initiates page table walk via a page miss handler 1710 to collect resolved physical page and permission information from memory 1500. Given that latency is already involved with performing the page table 1585 walk, the additional linear address tag table 1586 walk does not add significantly to the overall latency. The results of both walks are evaluated by walk analysis circuitry/logic 1750 and access is either allowed or disallowed based on existing permissions and/or LATT rules (some examples of which are described below).

If data access is allowed, then TLB fill circuitry/logic 1751 updates the TLB 1781 with a new entry corresponding to the walk. As mentioned, in addition to the physical address and permission data, the new entry may include the tag data and other metadata associated with the entry. Once the entry is filled in the TLB 1781, subsequent access with the same linear address will result in a TLB hit and neither of the walks are required.

Figure 18:
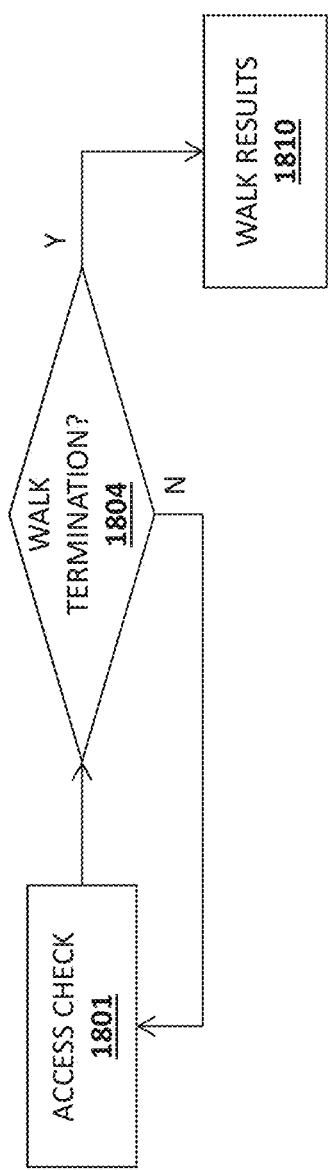
FIG. 18 illustrates one embodiment of a process for performing page walks with access checks.

FIG. 18 illustrates one embodiment of a process for LATT page walks. An access check operation 1801 is initially performed, and if the access check 1801 validates the operation (e.g., a tag match and/or permission validation), the next operation 1804 determines whether to terminate the walk based on another set of rules. For example, if the final tag data and page table entry has been reached, then the walk terminates and walk results 1810 are generated (e.g., comprising a valid physical address which may be cached in the TLB). If the walk is not terminated at 1804, then additional access checks 1801 may be performed on the returned data until the walk terminates.

In one embodiment of the access check operation, 0xFFFF is a special tag to allow access to all compartments. Thus, if this tag is detected any compartment is permitted to access this memory. If the tag is not 0xFFFF, then tag is checked against the current tag ID (CurrCompId) which may be stored in a control register such as a model-specific register (MSR). In one embodiment for an x86 implementation, this is a new register referred to as IA32_COMP_CONFIG. If a match is found, then further access is permitted. If the tag does not match, access is denied. In one embodiment on an x86 architecture, the following code sequence is implemented to perform the access check operation 1801:

```
If LATTx_ENTRY.CompId = = 0xFFFF, then
    BoolTagPass = TRUE
Else if LATTx_ENTRY.CompId = = CurrCompId, then
    BoolTagPass = TRUE
Else
    BoolTagPass = FALSE
If IA32_COMP_CONFIG.InNonNativeDomain = = 0 &&
LATTx_ENTRY = = 0x0000
    BoolTagPass = TRUE
```

In one embodiment, if in the native domain and LATTx_ENTRY.CompId==0x0000, then the memory access may be allowed because the implicit tag for native domain is 0x0000.

If an access check 1801 determines that access should be denied at any point in the walk process, then a fault code indicating the type of fault is stored in a fault register 1612 (e.g., TAG_FAULT_INFO). In one embodiment, the mismatched tag and report #PF is stored in the fault register with a page fault error code indicating that a LATT fault occurred. If the walk successfully completes (i.e., all access checks were validated), then the TLB 1781 is filled with the LATTx_ENTRY.CompId tag value.

In an alternative embodiment, LATT tables could be indexed based on Physical Addresses (PAs) of pages of memory. In virtualized systems, multiple levels of PAs may be defined, since Guest Physical Addresses (GPAs) may be translated to Host Physical Addresses (HPA) using a second level of paging. Instead of indexing each level of the LATT tables using a slice of linear address bits, a slice of physical address bits may be used instead.

An advantage of indexing LATT tables by physical addresses is that a single LATT table can be used across multiple processes in an unvirtualized system or in a virtualized system if the LATT tables are indexed using GPAs. If the LATT tables are indexed using HPAs in a virtualized system, then a single LATT table can even be used across multiple Virtual Machines (VMs).

A disadvantage of indexing LATT tables by physical addresses is that when memory is remapped, e.g. due to swapping a page out to disk, the corresponding LATT table entry may also need to be updated.

In an alternative embodiment, LATT table entries could be associated with a sub-page region of memory to support finer-grained security policies. Since TLB entries typically refer to a single page, this embodiment could store multiple LATT tag values in the corresponding page-granular TLB entry, or it could generate a separate TLB entry for each sub-page region.

2. Compartmentalization Architecture

As mentioned, one embodiment of the invention includes a compartmentalization architecture, which introduces the notion of a compartment identifier ("CID"). This CID value may be programmed into a specified control register of the processor/core. In one specific implementation, CID is a 16-bit identifier, although any number of bits may be used (e.g., 8 bits, 32 bits, 64 bits, etc). The CID uniquely identifies a compartment, allowing 64 k compartments to be allocated in a single process address space. In one embodiment, all data accesses are tagged if compartmentalization is enabled and the tag for a data access must match the current (active) compartment identifier programmed in the control register processor (e.g., a portion of the tag must be the CID value).

Below is a description of one specific set of ISA definitions for an x86 processor/core. This embodiment will be described with respect to FIGS. 19A-C which illustrate three control registers: IA32_COMP_CONFIG MSR 1901, a LATT_ROOT Control Register 1902, and a TAG_FAULT_INFO register 1903. Note, however, the underlying principles of the invention are not limited to these specific details and may in fact be implemented on any processor architecture with different types of control registers and control fields.

Compartments and Compartment Identifier (CID): Each compartment can be uniquely represented by a 16-bit compartment identifier (CID).

Current Compartment ID (CCID): This is the current (active) compartment on a processor/core and is programmed in the 'CurrCompId' field of the IA32_COMP_CONFIG MSR (e.g., encoded in bits 17:2 of the IA32_COMP_CONFIG MSR 1901). Note that the transition from non-native compartment to native compartment does not change the current compartment ID.

Native Compartment: To allow application software to implement compartmentalization efficiently and manage compartments, one embodiment of the invention includes a special compartment referred to as the "Native" compartment, which has a compartment ID value of 0x0000.

In one particular implementation, the native compartment is defined by the 'InNonNativeComp' bit in the IA32_COMP_CONFIG MSR 1901 (e.g., bit 1 in FIG. 19A). If software is executing in user mode and 'InNonNativeComp' is clear, the processor/core is executing in a native compartment. Note that this MSR can't be modified by user mode code and thus OS/Kernel can decide which piece of user mode code can act as the native compartment. In one embodiment, the native compartment relies on the user mode compartmentalization ISA described herein to implement non-native compartments.

In one implementation, the following data accesses are permitted from the native compartment:

Accesses using linear addresses tagged with tag=0x0000; and accesses using linear addresses tagged with tag=Current Compartment ID (CCID).

Non-native Compartment: Non-native compartments are true compartments which are managed by the native compartment. Non-native compartments can be represented by compartment IDs other than 0x0000 and 0xFFFF. If the 'InNonNativeComp' bit in IA32_COMP_CONFIG MSR 1901 is set, this means that the processor/core is executing in the non-native compartment.

COMP_U: This is a new instruction leaf for managing user mode compartments. One embodiment also includes a COMP_S instruction depending in circumstances where there is a use case for supervisor software. In one embodiment, the RAX register provides an indication of which leaf has to be invoked.

COMP_U[ENTER].RCX—This is a leaf of COMP_U which allows program code to enter into a compartment. Software must program RCX with the Compartment ID to make it the active Compartment ID. After a successful completion of this instruction, the processor/core will update the 'CurrCompId' field in IA32_COMP_CONFIG MSR 1901 with the RCX value. This will also set 'InNonNativeComp' bit in the IA32_COMP_CONFIG MSR 1901 to indicate that compartment execution is now in a non-native compartment. This leaf will result in #UD in the non-native compartment.

COMP_U[EXIT]—This leaf of COMP_U allows software to exit a compartment willingly. This leaf will result in #UD in the native compartment.

COMP_U[CURR_COMP_ID]:RAX—This leaf of COMP_U returns the current Compartment ID to software in the RAX register. This leaf is permitted in both native and non-native compartments.

Processor/Core Registers: One embodiment of the invention includes the following new registers/MSRs illustrated in FIGS. 19A-C. These registers may be used to assist in compartmentalization as described herein.

IA32_COMP_CONFIG MSR 1901—This MSR is unavailable for direct access to user mode code.

En (bit0)—If set, enables compartmentalization ISA and LATT in user mode.

InNonNativeComp (bit1)—If set, processor is executing non-native compartment. If clear, processor is executing native compartment.

CurrCompId (bit2-17)—Contains the Compartment ID of the currently active non-native compartment.

COMP_EXIT_RIP—Points to the instruction pointer where control will be transferred after the compartment executes COMP_U[EXIT] leaf.

LATT_ROOT Control Register 1902: The LATT_ROOT control register is accessible to supervisor mode only and points to the root (physical address) of the linear address tag table (LATT). Reserved fields must be cleared and ROOT_LATT_PA is a 4K aligned physical address of the root of the LATT.

TAG_FAULT_INFO register 1903: This register is accessible to supervisor mode only and is used for reporting fault info pertaining to LATT page walk.

The MismatchedTagId field reports the tag present in the LATT table which did not match with rules with respect to current Compartment ID of processor. This information will help the page fault handler of the operating system to take corrective actions related to tag assignment to compartments.

Figure 20:
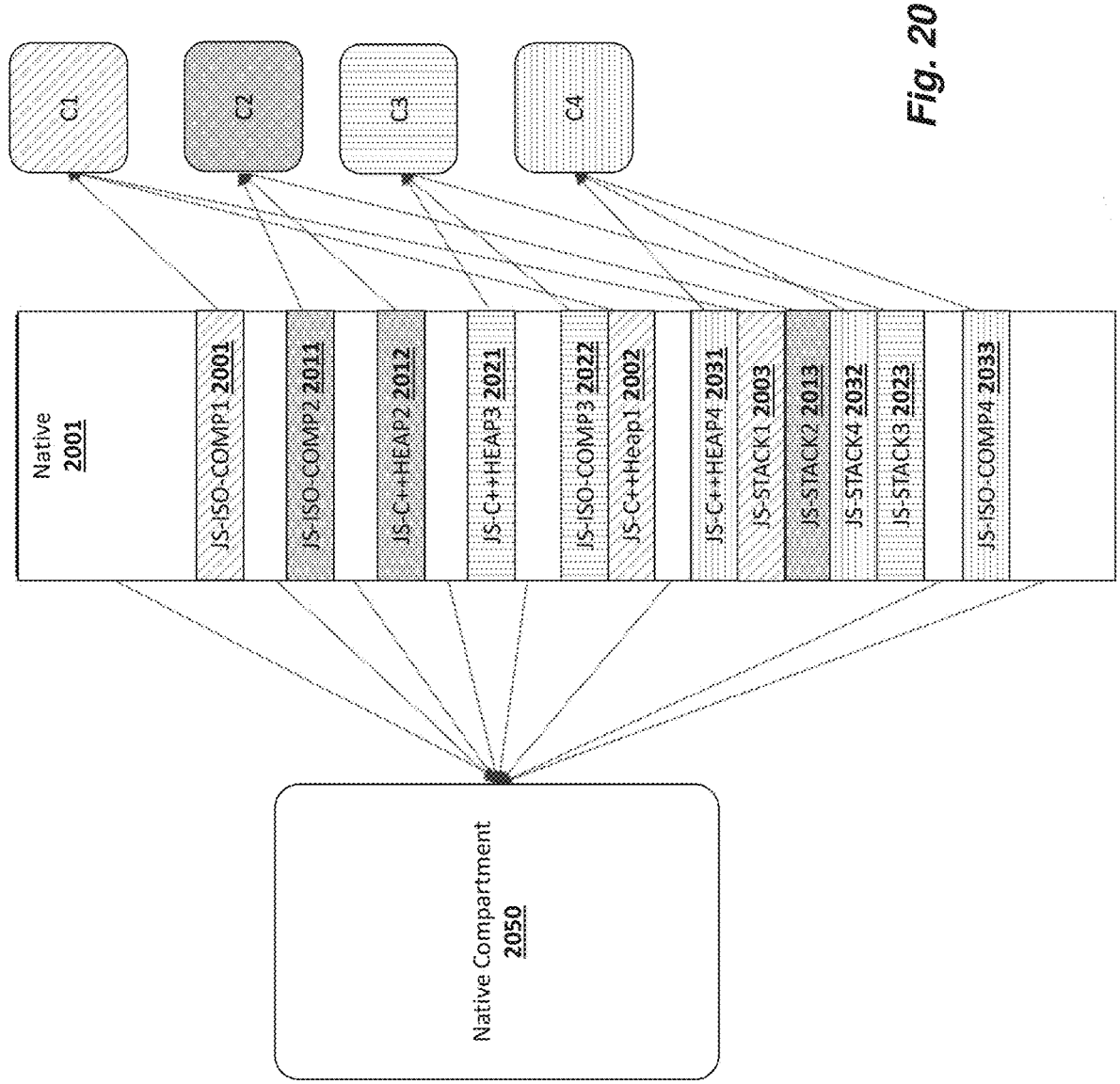
FIG. 20 illustrates a specific example of compartmentalization using the embodiments of the invention.

FIG. 20 illustrates a specific example in which a particular browser (Chrome) uses process memory to launch various JavaScripts as different sandboxes in the same process. For example, if a user opens 'www.cnn.com' in the browser, there are many other elements which show up in the webpage such as ads.

Using the compartmentalization and LATT techniques described herein, a single native compartment 2050 is defined with a corresponding process address space 2001 and separate isolated compartments C1-C4 are defined for the other elements incorporated in the webpage which are completely isolated in the process address space. Specifically, in this example the four different patterns differentiate four different JavaScript instances in the same address space. Compartment C1 includes components 2001-2003, C2 includes components 2011-2013, C3 includes 2021-2023, and C4 includes components 2031-2033.

In an alternative embodiment, additional registers are defined beyond a single CurrCompId to match against more compartment ID values. For example, some compartment ID values may be assigned for the private data accessible only to individual compartments, and other compartment ID values may be assigned to data that is shared across multiple compartments. In this embodiment, a number of additional registers are provided (e.g., and identified as SharedCompIdX, where X is the register number), to permit access to that number of shared compartment IDs. When switching to a compartment, each SharedCompIdX register may be initialized with the compartment ID values for the shared data that is authorized to be accessed from that compartment.

In an alternative embodiment, an additional register, e.g. labeled SharedCompIdEnable, may comprise enable bits for individual SharedCompIdX registers so that a SharedCompIdX register may only match a CID value if its corresponding enable bit in SharedCompIdEnable is set. This may enable software to update just a single register, SharedCompIdEnable, when switching compartments to select the access permissions for the destination compartment instead of updating individual SharedCompIdX registers.

Another useful way of assigning compartment ID values is to grant one compartment access to data in a different compartment in a sandboxing model. One particular implementation will be described with respect to FIGS. 21-22.

Figure 21:
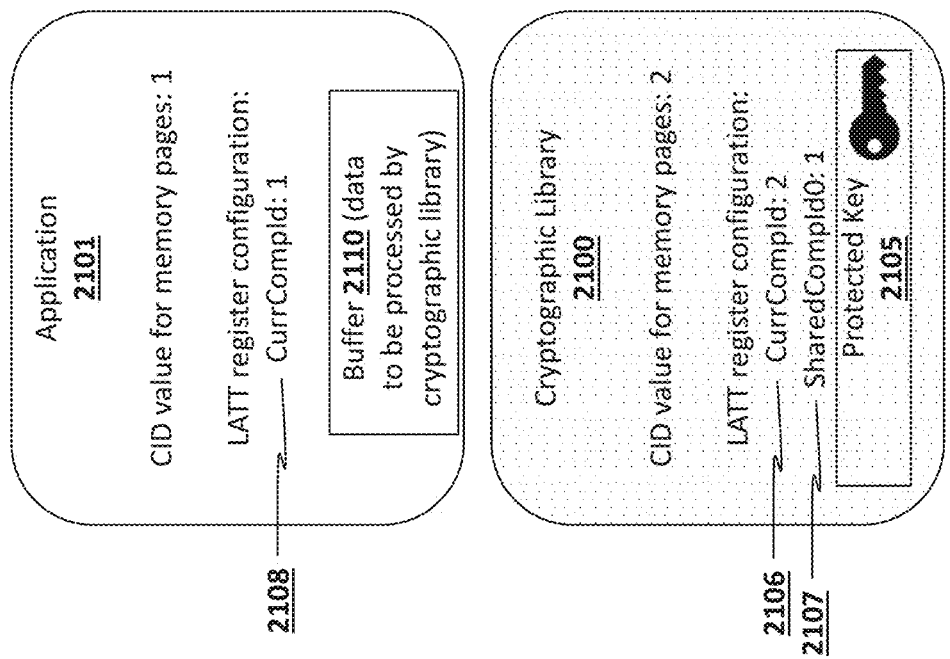
FIG. 21 illustrates a specific example using a cryptographic library provided access to an application buffer.

As illustrated in FIG. 21, a cryptographic library compartment 2100 with a protected key 2100 efficiently processes data in an application 2201 without requiring that it first be copied into the cryptographic library compartment 2100 and later copied back into the application compartment 2101 by treating the application as a sandbox that is denied access to the protected key 2105 in the cryptographic library compartment 2100.

Preventing the application 2101 from accessing the protected key 2105 can be enforced by configuring the SharedCompId0 register 2107 to deny access to any additional pages of memory beyond those pages already granted by the configuration of the CurrCompId register 2106. Granting the cryptographic library 2100 access to an application buffer 2110 containing the data to be processed by the cryptographic library 2100 can be accomplished by setting the SharedCompId0 register 2107 to the value of CurrCompId 2108 used by the application 2201.

However, drawbacks of defining many additional SharedCompIdX registers are that they each require time to initialize, memory may need to be allocated in saved context areas to store the SharedCompIdX register values (for subsequent restore operations), and they may consume additional silicon area and energy for access checks.

An alternative embodiment to minimize these drawbacks is to define multiple compartment ID values for shared data using a pair of registers. For example, a contiguous range of compartment ID values can be specified using a pair of registers containing a lower bound (SharedCompIdX.LB) and an upper bound (SharedCompIdX.UB), respectively, on the ID values. Any page with a compartment ID value within the specified range would be accessible. Another example is to specify a base (SharedCompIdX.Base) and mask (SharedCompIdX.Mask) for accessible compartment ID values such that if the result of performing a bitwise AND operation on the base register value and the mask register value matches the result of performing a bitwise AND operation on the compartment ID for a page and the mask register value, then access to the page is authorized.

Figure 22:
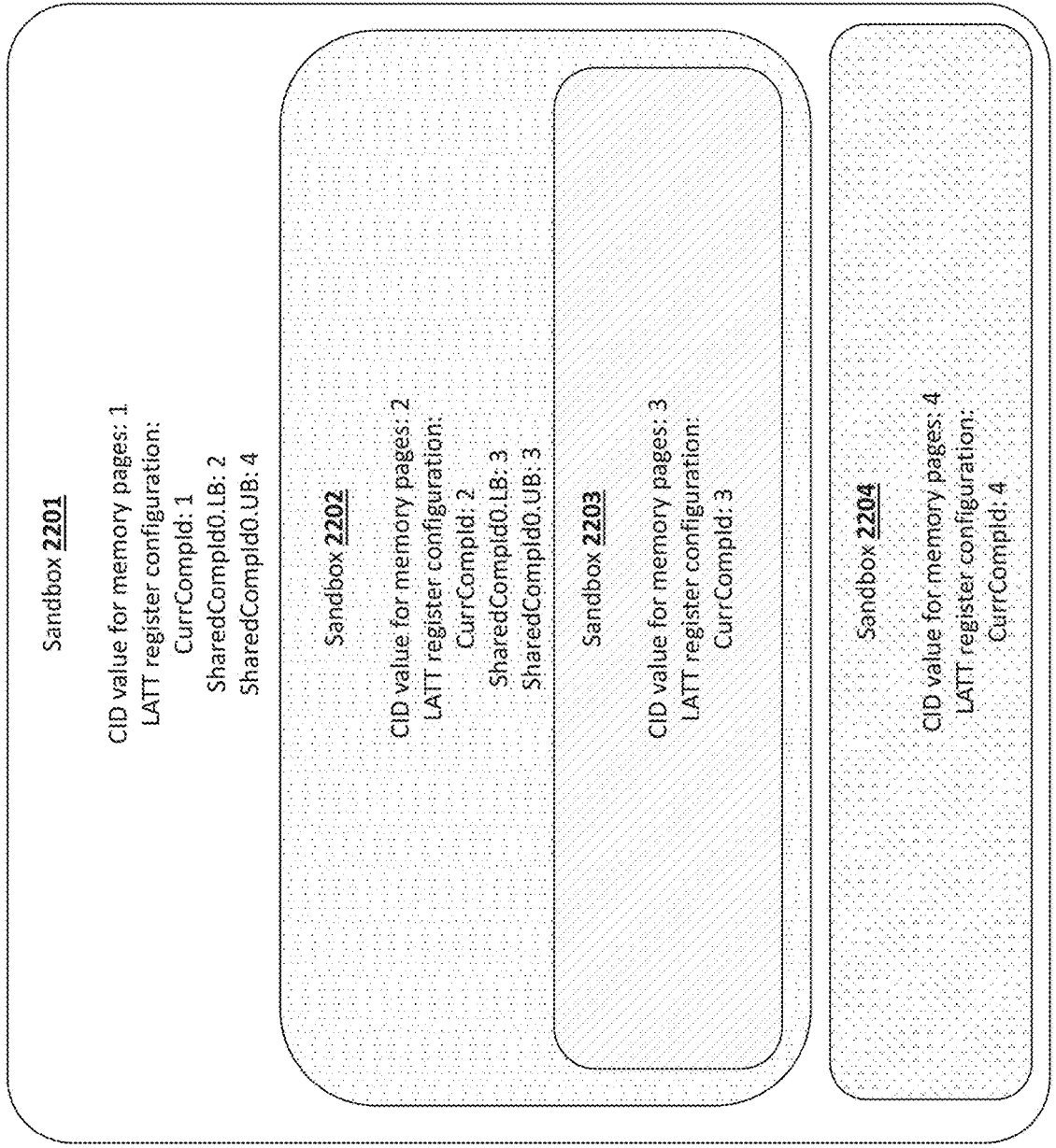
FIG. 22 illustrates an example comprising a plurality of hierarchically arranged sandboxes.

Referring now to FIG. 22, specifying ranges of shared compartment ID values is especially useful for supporting nested sandboxes 2201-2204. The illustrated example comprises a hierarchical nested arrangement with sandbox 2201 comprising a parent to sandbox 2202 and 2204, and with sandbox 2202 comprising a parent to sandbox 2203. In one embodiment, each parent sandbox such as sandbox 2201 is authorized to access the code and data of any sandbox that it contains directly or that is transitively contained within any of its direct children 2202, 2204. This can be enforced by allocating compartment IDs for a hierarchy of nested sandboxes contiguously so that the SharedCompIdX.LB and SharedCompIdX.UB can be set to cover the entire range of compartment IDs that are authorized for access from the current level of the nesting hierarchy.

In an alternative embodiment, a permission override field may be included alongside each set of registers that matches CIDs. Instead of directly using permissions computed from the page walk, the permissions may be modified based on the permission override field. For example, each permission override field may comprise a read, write, and execute bit. The permissions specified by those bits may completely replace the permissions determined by the single- or multi-dimensional page table walk for a page with a matching CID.

Alternatively, the permission override bits may limit the permissions determined by the page table walk. For example, if the permissions determined by the page walk for a page are read and write, with execute disabled, whereas the permission override bits in a register that matches the CID for the page indicate read and execute permissions, then the effective permissions may be read-only. The processor may require a permission to be granted both by the page table walk and the permission override bits for the permission to ultimately be granted to the software.

Alternatively, the permission override bits may upgrade the permissions determined by the page table walk. For example, if the permissions determined by the page walk for a page are read-only, whereas the permission override bits in a register that matches the CID for the page indicate write permissions, then the effective permissions may be read and write. The processor may require a permission to be granted either by the page table walk or by the permission override bits for the permission to ultimately be granted to the software.

Furthermore, some embodiments may use the unmodified permission bits determined by the page table walk for pages with CIDs that do not match any of the registers containing permission override bits. Alternative embodiments may treat pages with CIDs that do not match any of the registers containing permission override bits as being inaccessible.

Some embodiments may include permission override bits in LATT entries and combine them with permission bits from the page table and the registers containing permission override bits, if such registers are included in the embodiment, to compute the permissions granted to software. For example, the permission bits in an LATT entry with a CID matching a CurrCompId or SharedCompIdX register may replace, limit, or upgrade the permission bits from the corresponding page table entry, and then the resultant intermediate permission bits may be further limited or upgraded by the permission bits in the matching register, if such bits are stored in the matching register.

In some embodiments, a bit may be defined in page table entries to disable read access. This may be used in combination with other permission bits that may be configured to disable write and execute access so that a page table entry simply provides address mapping information without granting any permissions to the page by default. Permission bits in LATT entries or CurrCompId or SharedCompIdX registers may then be used to upgrade the permissions for such pages in particular subprocesses.

The global bit in a page table entry indicates that the page mapping should be accessible across all processes. In some embodiments, the global bit in page table entries for user-mode pages may not be used to mark any such pages as globally-accessible. That bit may be redefined in a new mode to be the read disable bit to avoid needing to redefine other bits in the page table entry that may be used by software. In other embodiments, an ignored page table entry bit may be redefined as the read disable bit so that it can be used both for usermode and kernel pages.

As another example, each four bit override may selectively upgrade each of the read, write, and execute permissions individually, with a single reserved bit to align the groups of permission overrides to a power of two boundary. This reserved bit may be used it indicate if the associated page has been accessed or is dirty. That is, the reserved bit may be used to encode the accessed bit or dirty bit found in conventional page table entries (PTE).

In an embodiment where the PIT permissions pages can only improve (i.e., make less restrictive) the root CR3 permissions, the CR3 register (or other base address control register) may contain a "root-PCID" whose tag may be looked up in the TLB in parallel or before looking up the "per PIT entry PCID" associated tag in the TLB. This is an optimization where the root CR3 page table tag mappings may be shared across all sub-processes in the TLB (effectively allowing those TLB mappings and permissions to be reused). Only if the permissions in the root TLB entry raise a fault, or there is no root TLB entry found, then the PIT entry PCID would be used (or associated permissions looked up). This effectively makes the Root-PCID a global PCID across all sub-processes that sub-process PIT entries may override the permissions.

Access to the CurrCompId, SharedCompIdX, and SharedCompIdEnable registers may be restricted to software in designated processor privilege levels, e.g. an operating system running in supervisor mode, to regions containing code that is trusted to update those registers, or to software running with the 'InNonNativeComp' bit in the IA32_COMP_CONFIG MSR 1901 cleared. In an alternative embodiment, control transfers between compartments may be accelerated by providing an instruction to allow software that is not trusted to arbitrarily update the CurrCompId, SharedCompIdX, and SharedCompIdEnable registers to perform control transfers that have been pre-authorized by trusted software. Those pre-authorization decisions can be represented in memory by a compartment table containing entries with settings for the CurrCompId, SharedCompIdX, and SharedCompIdEnable registers. The corresponding registers may be initialized to those values when entering the compartment. Each compartment table entry may also specify an authorized entrypoint into the compartment that may be used to initialize the instruction pointer when entering the compartment. Each compartment table entry may also contain a present bit to indicate whether the compartment table entry is present. The base address for the table may be referenced by a register, such as an MSR, that is only accessible from trusted software.

An instruction, e.g. a COMP_U[SWITCH].RCX leaf of COMP_U, may accept a compartment table entry index as an input operand in the RCX register and switch to the compartment settings contained in that compartment table entry. If the selected compartment table entry is not present, then a fault may be generated.

In an alternative embodiment, an instruction may be defined, e.g. labeled NarrowSharedCompIdEnable, to enable untrusted software to selectively clear bits in the SharedCompIdEnable register. It may accept an input operand specifying bits that indicate which bits in the SharedCompIdEnable register should be cleared so that the corresponding SharedCompIdX registers are inactivated. If a SharedCompIdEnable bit indicated in the operand to the NarrowSharedCompIdEnable instruction is already cleared, then that bit may remain cleared.

In another alternative embodiment, an instruction may be defined, e.g. labeled NarrowSharedCompId, that accepts three operands:
1. An index identifying a particular SharedCompIdX register that specifies a lower bound and an upper bound for matching CIDs.
2. A new lower bound for the selected SharedCompIdX register.
3. A new upper bound for the selected SharedCompIdX register.

The NarrowSharedCompId instruction may first check whether the new lower bound is lower than the existing lower bound in the selected SharedCompIdX register or the new upper bound is higher than the existing upper bound in the SharedCompIdX register. If either of those conditions is true, then the NarrowSharedCompId instruction may generate a fault. Otherwise, the NarrowSharedCompId instruction may set SharedCompIdX.LB to the specified new lower bound and it may set SharedCompIdX.UB to the specified new upper bound.

In another alternative embodiment, an instruction may be defined, e.g. labeled NarrowPermissions, that accepts two operands:
1. An index that selects a CurrCompId or SharedCompIdX register.
2. A bitmask for the permission override bits associated with the selected CurrCompId or SharedCompIdX register.

The NarrowPermissions instruction may operate by modifying the permission override bits in the selected register so that they may reduce the permissions granted to software for pages with matching CIDs. For example, if the permission override bits replace or limit the page permissions or if they upgrade page permissions, then the NarrowPermissions instruction may clear any bit in the permission override bits in the selected register that is not also set in the bitmask operand.

The NarrowSharedCompIdEnable, NarrowSharedCompId, and NarrowPermissions instructions may be used by software to reduce the needed number of compartment table entries. A compartment table entry may initially provide access to many pages with many permissions and then untrusted code A in the compartment may drop permissions using the NarrowSharedCompIdEnable, NarrowSharedCompId, and NarrowPermissions instructions so that code B that runs subsequently in the compartment has less access due to reduced permissions. Code A may contain a static set of instruction operands for reducing the permissions for code B, or it may dynamically compute the instruction operands for reducing the permissions for code B.

This could have also been accomplished without the NarrowSharedCompIdEnable, NarrowSharedCompId, and NarrowPermissions instructions by creating a separate compartment table entry for the code B specifying just the reduced permissions for code B, but that has the disadvantage of consuming an additional table entry that needs to be initialized by trusted software, which may impose additional overhead.

In one embodiment of the walk termination determination 1804, if access was not allowed from the access check operation 1801, then the walk is terminated for this reason. In addition, regardless of the access check, if the last stage of the page table lookup has been reached, then the walk is terminated (i.e., because the physical address has been located in a page table entry). In one embodiment, LATTx_ENTRY.Term being set means that the walk should be terminated. If the walk does not need to be terminated, then it is continued through the multiple LATT translation structures 1621-1624 to generate walk results 1810.

Thus, using the LATT techniques described herein, browsers or any other type of program code/application can use sub-process sandboxing to improve security. In particular, these embodiments of the invention allow software to take advantage of hardware guaranteed sub-process memory isolation, resulting in a variety of benefits including a reduced memory footprint (process based isolation techniques tend to utilize more memory), improved performance because the compartmentalized processes are executed in the same address space (reducing kernel transition time); and improved security as more privileged components from the kernel can move into user space with heightened security and isolation guarantees, paving the path for microkernel design.

Apparatus and Method for Efficient Process-Based Compartmentalization

Due to side-channel concerns within a shared address space, the industry is moving increasingly to fine-grain process separation to provide security between compartments. The embodiments of the invention improve the efficiency of process separation techniques by sharing page table structures (shared address space) and providing directed address vector/branch targets and a pure user space process switching mechanism that may be controlled by process group configurations and custom process permissions.

On existing implementations, process context identifier (PCID) values are used to distinguish between address spaces assigned to different processes. On certain architectures, address space identifiers or ASID values are used to distinguish between address spaces.

Referring back to FIG. 12, when a process is swapped in for execution by a core, the base address stored in control register CR3 1201 includes the PCID value associated with that process (e.g., on some x86 implementations, the PCID value is stored in bits 11:0 of CR3). In this way, the PCID value can be used to distinguish between different address spaces for different processes. The PCID value and/or other address space identifier may also be cached in the core's TLB along with the corresponding virtual-to-physical address translations performed on behalf of a process. To save space within the TLB, a value derived from the PCID/address space identifier or other information that is smaller than that combined input information may be stored in the TLB to identify the address space context associated with each TLB entry. For example, a hashing algorithm may be used to combine those inputs. As a result, the TLB entries associated with the PCID or other address space identifier can be maintained when the process is swapped out because they can be distinguished from other entries associated with other processes.

Embodiments of the invention define a grouping mechanism for CR3 paging structures and process context identifiers (PCIDs) into "super processes." In one implementation, a root control register is shared by processes to access multiple PCID index mappings, where each PCID index provides a "customization" to the root paging structure. This group constitutes a super-process configured by supervisory software (e.g., the operating system kernel). In one embodiment, the root control register comprises a CR3 register or a new control register or MSR which stores a reference to a physical page (e.g., a guest physical address (GPA)) containing an indexed list of PCID values and their corresponding root paging structures (e.g., sub CR3 registers).

Figure 23:
FIG. 23 illustrates one embodiment of a PCID index table.

FIG. 23 illustrates one embodiment of this indexed list, referred to herein as the PCID Index Table (PIT) 2300. Each entry in the PIT 2300 includes a unique PIT index value which is associated with a PCID value and a physical address of the root paging structure for this PCID. The base address of the PIT 2300 is read from the root control register which is combined with a PIT index value to identify an entry in the PCID index table 2300. The corresponding physical address (e.g., a PML4 address in one embodiment) is read from the entry to identify the root paging structure for this particular PCID.

One embodiment of the invention includes an instruction to switch the PCID index among a group of customized paging structures that can override or customize the basic root paging structure (e.g., the CR3 paging structure in some processor implementations). One example of this instruction is as follows:

SWITCHSP (PITindex, LinearAddress);

which sets the root control register with the PIT index value for a new sub-process and jumps to the linear address.

In one embodiment, the basic page table structures or portions of the basic page table structures are shared between sub-processes. However, permissions may be set differently for each sub-process and/or there may be some unique memory mappings which are different from the basic root structure.

In one embodiment, modified permissions are provided by first walking the paging structure identified by the PCID index, collecting any permissions or page mappings, and then walking the basic root paging structure, overriding any mappings or permissions from the basic root paging structure that were also found in the PCID-indexed PIT paging structure. Alternatively, the root CR3 paging structure can be walked first followed by the PCID-indexed paging structure to determine if there are any overridden permissions or mappings indicated in the PCID-indexed paging structure for the given linear address.

Figure 24:
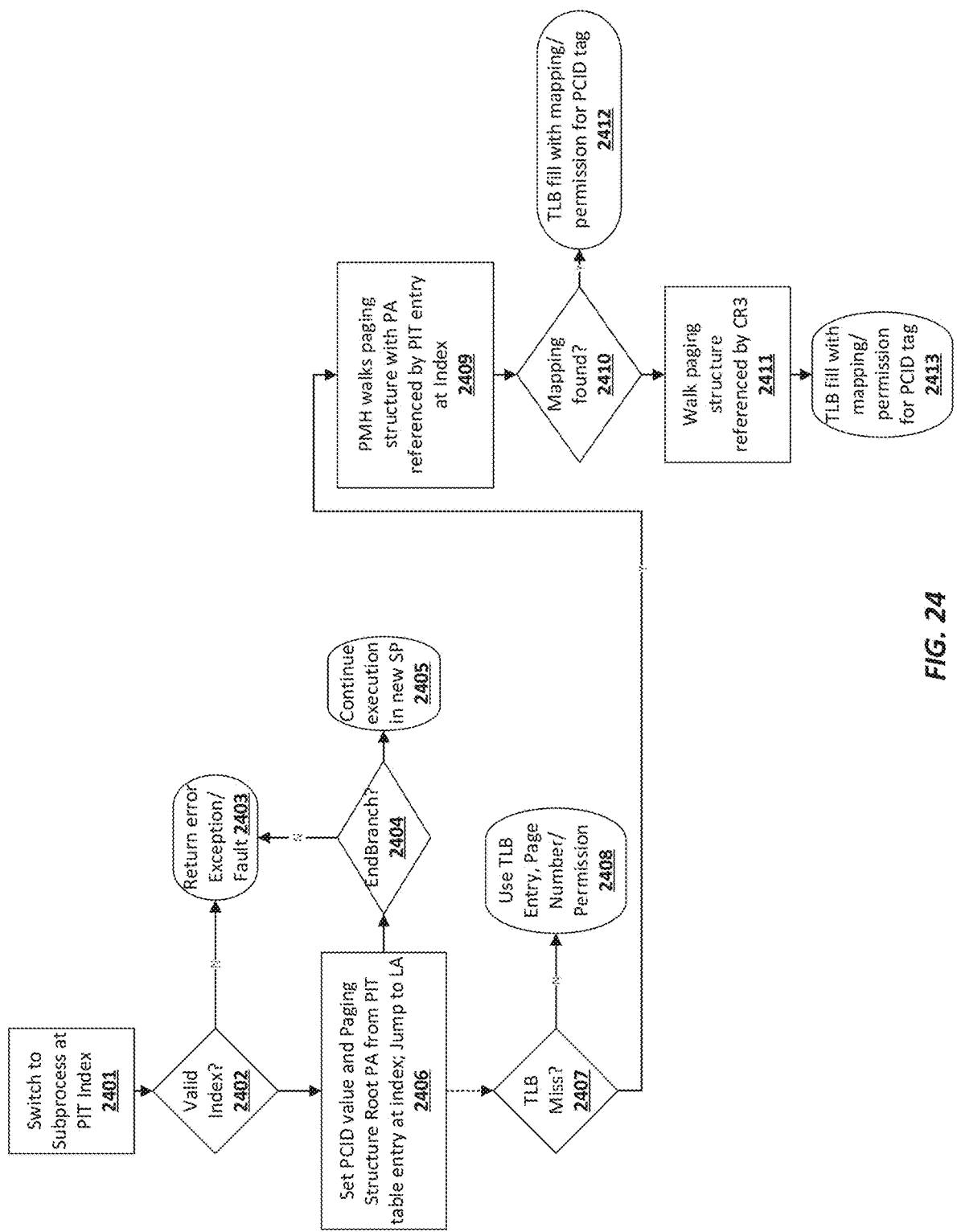
FIG. 24 illustrates a method in accordance with one embodiment of the invention.

FIG. 24 illustrates a method in accordance with one embodiment of the invention. The method may be implemented within the context of the architectures described above, but is not limited to any particular architecture.

At 2401 a sub-process is swapped in for execution on a core (e.g., Core 0 on processor 1555) at a specified PIT index. If the index is valid, determined at 2402, then at 2406, it is used to perform a lookup in the PIT 2300 to identify the PCID value and paging structure root physical address (PA) and a jump is performed to the specified linear address. If the index is invalid, then an exception/fault is returned at 2403.

In one embodiment, the user space process switch instruction is not a SYSCALL which would require a call to a privilege level 0 system component. Rather, it is a far jump/branch instruction that takes the linear target address (e.g., LinearAddress in the instruction SWITCHSP (PITindex, LinearAddress)) and specifies a PCID index value (e.g., PITindex) which may be provided as an instruction immediate or as a register value.

In one embodiment, at 2402, the memory management unit 1590 of the processor will first check that the specified PCID index value is part of the super-process group in the PCID index table 2300. If so, it will then switch to the PCID and paging structure specified in the PIT 2300 identified by the index and, at 2404, will check for a directed address vector (DAV) or ENDBRANCH instruction indicating a sub-process switching entry point in the receiving sub-process (e.g., the branch target). This way, software can specify any number of branch targets in the code itself, without the need to list entry points specifically in the PIT, although this may be done in an alternate embodiment of the invention.

In one embodiment, the PCID values from the PIT 2300 are used (indirectly) to tag TLB 1781 entries, where each PCID index value identifies a PCID value for the indexed paging structure (identified by the PCID Index PA). In this implementation, the memory management unit 1590 maps the PCID to a field in each TLB entry associated with the process, which is used as an address space identifier tag. As previously mentioned, the full PCID may not be directly stored in each TLB entry, but rather used as one input to compute an address space identifier which may be stored in the TLB entry. Thus, when searching the TLB at 2407, only entries containing this PCID and/or address space ID value are searched. In response to a TLB hit, the address mapping and permissions are read from the TLB at 2408 and the process ends.

In response to a TLB miss at 2407, however, at 2409 the PIT indexed paging structure is walked first by the page miss handler (PMH) running on the processor. If a mapping is found at 2410, the walk is terminated and a new TLB entry with the PCID tag is cached. If a mapping is not found (e.g. not present in the PIT-indexed paging structure), or only permissions are found, the results are stored (e.g., in a PMH state register or other control register). The CR3 paging structure is then walked at 2411 to retrieve the memory mapping and/or the permissions (depending on what was found in the PIT-indexed walk). Note that if the PCID mapping is not present, the CR3 mapping/permissions are used by default. The results are then stored in a TLB entry at 2413 using the PCID tag.

If only the permissions are to be used from the PIT-indexed paging structure, this means that the leaf of the PIT-indexed paging structure indicates permissions, but does not include a valid memory mapping. In one implementation, this is accomplished using an invalid physical address for the page, such as by setting the PA to a default/special value (e.g., MAX_PA+1 indicating no page mapping). If the PIT-indexed page is not present, then the CR3 page walk results are used instead and associated with the TLB entry using the PCID and/or address space ID tag.

Figure 25:
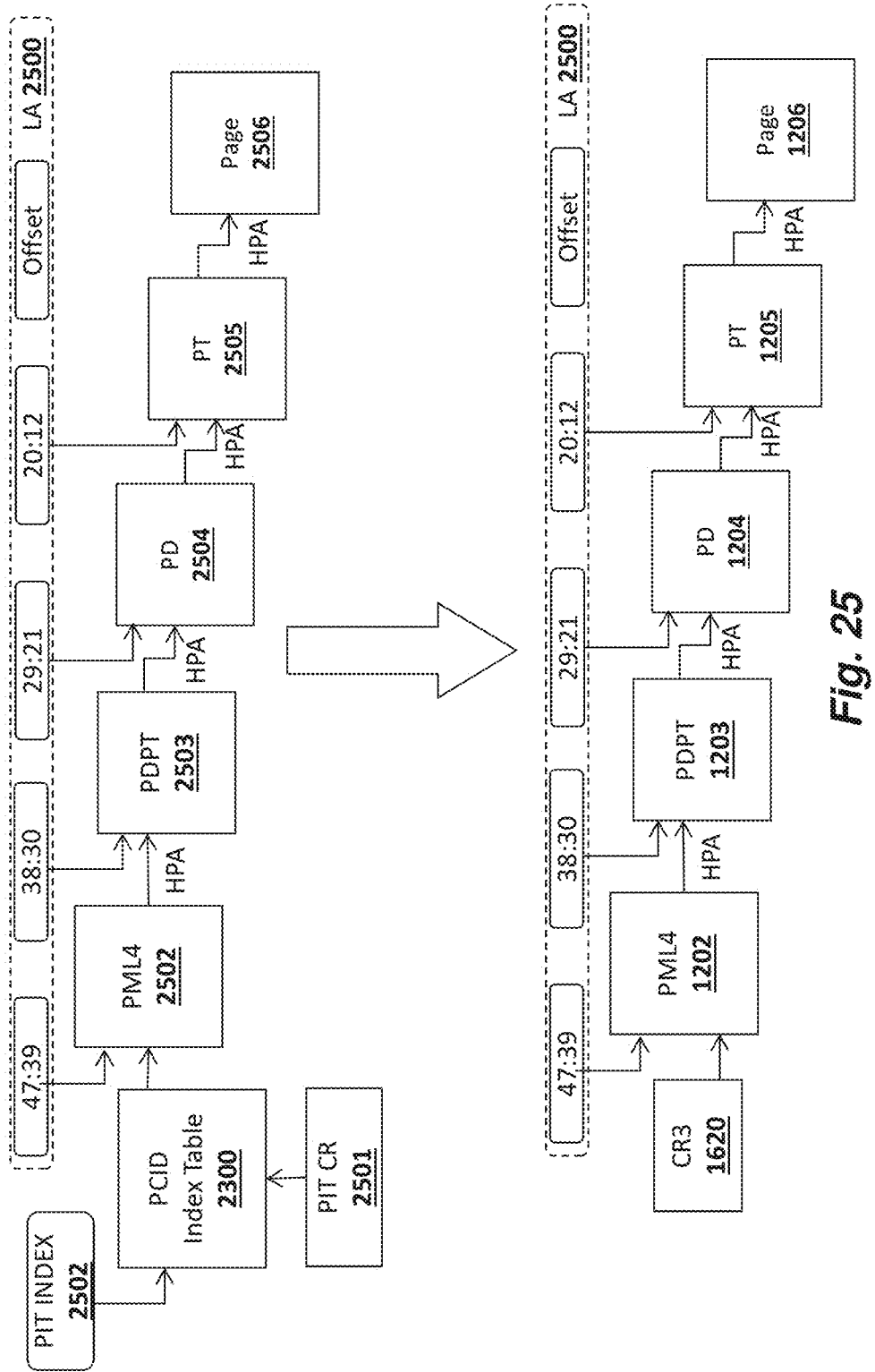
FIG. 25 illustrates one embodiment including first and second translation structures.

FIG. 25 illustrates the different sets of translation tables used in one embodiment. First, using the PIT index value 2502 and base PIT address stored in a control register 2501, an entry in the PIT is identified with a physical address pointing to the next level translation table 2502 (a PML4 table in the specific example). Bits 47:39 of the linear address 2500 provide an offset to identify an entry in the PML4 table 2502 which provides the next physical address (PA) to identify the base of the PDPT 2503. The PA may be a guest physical address in a virtualized system or a physical address in an unvirtualized system. In some embodiments, it may be a host physical address. Bits 38:30 identify an entry within the PDPT 2503 which identifies the base address of the PD 2504 and bits 29:21 of the linear address 2500 identify an entry within the PD 2504. The resulting HPA identifies the base of a page table 2505 and bits 20:12 identify a specific page table entry pointing to a page 2506. At this stage, if the mapping provides both a valid physical address and permissions, then these results are stored in a TLB entry which is tagged with the relevant PCID value.

If no valid address mapping is found, or if only permissions are found, then a walk is performed through the CR3-based page tables. In particular, the CR3 register stores the base address for the PML4 table 1202 within which bits 47:39 identify the relevant entry containing the physical base address of the PDPT table 1203. The remaining operations are performed as described above (see, e.g., FIG. 12 and associated text) until the page 1206 is located. As mentioned, if permissions were found in the PIT-index paging structure 2502-2506, then these permissions may be used in place of any permissions found in the page 1206 and stored in the TLB.

Alternatively, or in addition, the permissions found in the page 1206 may be used in accordance with any of the permission management techniques described above. For example, permissions may be determined using permission override fields which modify, limit, and/or upgrade the permissions determined by the page table walk.

In an alternate embodiment, a lookup is initially performed within the root base table before searching the PIT indexed table, or vice versa. The underlying principles of the invention are not limited to the particular order in which the table lookups are performed. Moreover, in some embodiments, the tables (or some portion thereof) are looked up in parallel.

Figure 26:
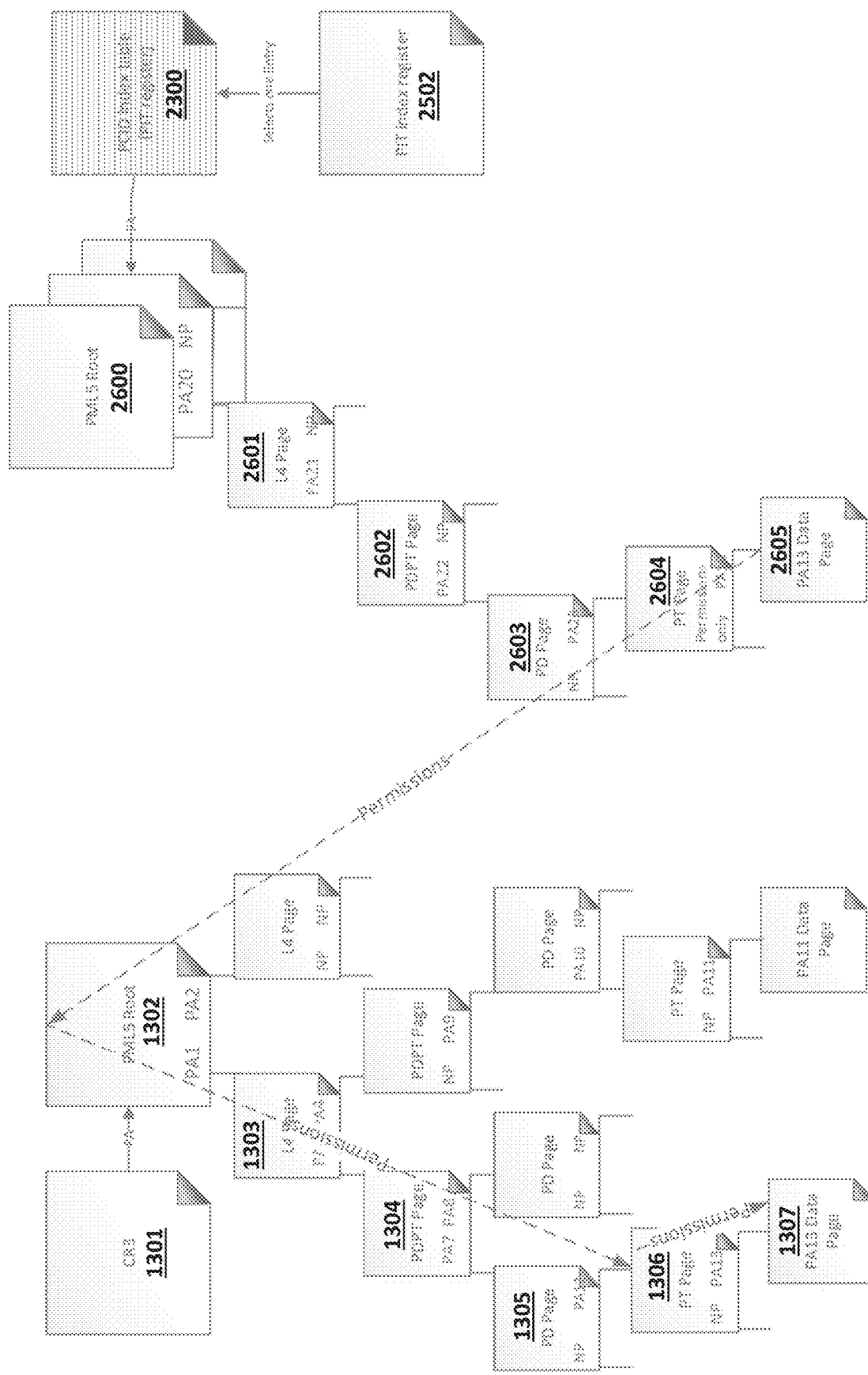
FIG. 26 illustrates one embodiment in which permissions from the first translation structure overrides permissions in a second translation structure.

An example page walk using a 5-level paging architecture is illustrated in FIG. 26. The first sub-process paging structure is the PML5 root paging structure 2600 identified by the PIT 2300 entry using the PIT index 2502. The first page walk through the PIT-indexed paging structure 2601-2604 is performed as described above to reach a data page 2605. If the data page 2605 mapped to by the linear address is valid, the walk terminates and the TLB is updated with an entry containing the PCID/address space ID tag, the physical address, and permissions.

If only permissions were found but not a valid page mapping, then the second walk is performed, identifying the PML5 root 1302 using the address in CR3 1301 and proceeding through the stages of the lookup 1303-1306 until the corresponding data page 1307 is located to determine the physical address associated with the linear address. In one embodiment, the permissions found in the PIT-index paging structure walk (e.g., in page tables 2601-2604 that map to the data page 2605) override any permissions found in the page tables 1302-1306 that map to data page 1307. Any of the alternate/additional techniques described above for managing permissions described above may also be used. If a simple override is performed, then the resulting TLB entry will include the permissions from the first walk with the physical address from the second walk.

The TLBs may assume that super processes share the same memory mappings, but have different permissions across groups. As such, the ASID space may be divided into a shared address space (mappings) and a list of tags for the CR3/PCID-specific permissions of the sub-process. By way of example, and not limitation, Protection Keys may also be used within the sub-processes to achieve this.

On current systems, an operating system running in ring-0 supervisory mode is typically required to perform CR3 switching. In contrast, the embodiments of the invention described here allow a ring-3 user space process to switch to a sub-process without operating system intervention.

In one embodiment, the sub-process space is assigned by the kernel, virtual machine monitor (VMM), or other privileged software entity using an indexed array such as the PCID index table 2300. This may be done via a VMFUNC EPTP-List operation or a similar operation. The difference here is that instead of switching extended page table pointers (EPTPs), the process is switched into a PCID index identifying a new paging structure and corresponding PCID value. The OS kernel or VMM may configure the PIT page 2605, entry by entry, and a new control register 2501 or a Virtual Machine Control Structure (VMCS) field is defined to identify the physical base address for the PIT 2300. The CR3 register 1301 then contains the root page table with base permissions and page table mappings across all the PIT entries. Like host-based linear address translation, the individual PIT entries also point to a page table (paging structure), but this is a sub-process page table primarily concerned with permission overrides and memory mappings. This sub-process information only modifies a subset of the paging structure, sparsely populating just those regions of memory (linear address pages) that have permissions overridden, whereas the CR3 paging structure is fully populated and shared across the subprocesses. For portions of the subprocess page table which are not present, the memory management unit 1590 will then defer to the root CR3 1301 paging architecture, which contains all the memory mappings. Like an EPTP List index, one embodiment of the invention includes an index register that indicates which PIT entry is current for the process.

Figure 27A:
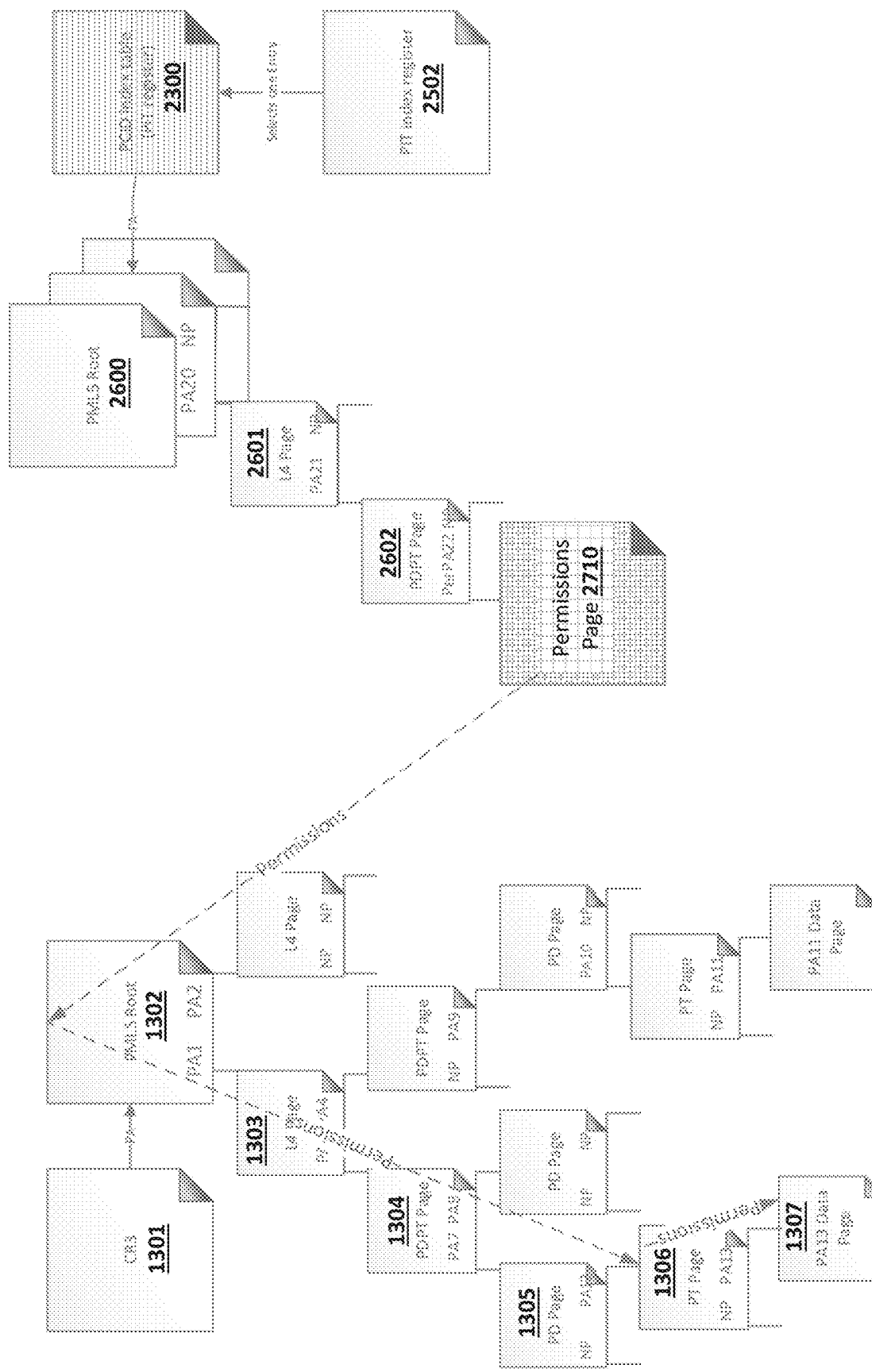
FIG. 27A-B illustrates embodiments in which permissions are efficiently mapped at a higher level of granularity.
Figure 27B:
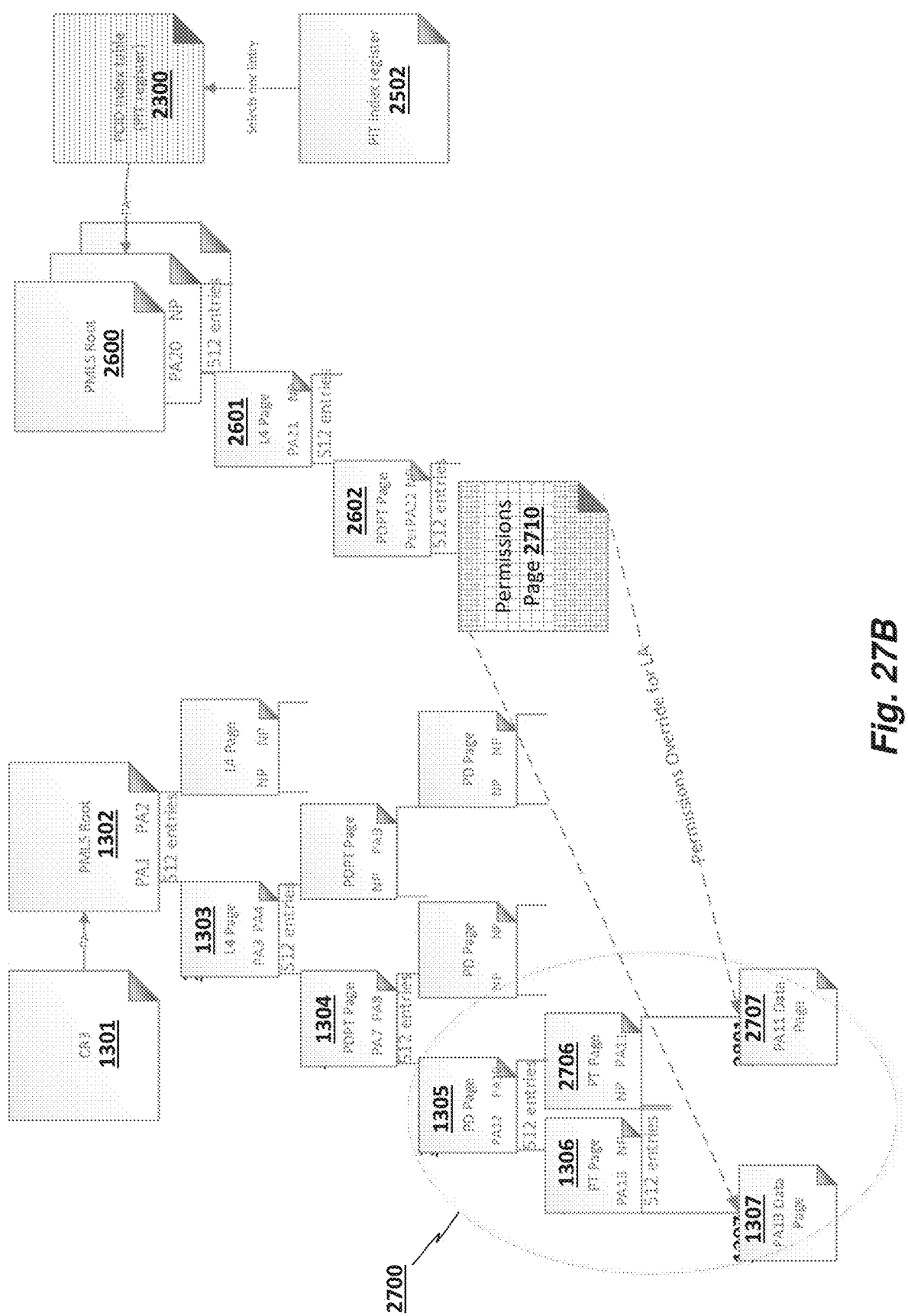

One embodiment of the invention performs permission page optimizations as illustrated in FIGS. 27A-B. To make the permission paging structure even more memory efficient, the page directory 2603 and page table 2604 are merged into one leaf, the permissions page 2710. In this implementation, each of the 32K bits on the page 2710 represents the permission override for a set of 8 pages (or 16 pages for two bit permission overrides, or 32 pages for four bit permission overrides). For example, each single bit override may operate as a write-enable bit if the CR3 root permission is read only, or may operate as a read-enable bit if the CR3 root permission is not readable.

As another example, each two bit override may operate as an encoding of permissions for the associated page or memory region. For example: override bit value 00 means the page is inaccessible. Bit value 01 means the page is readable, bit value 10 means the page is both readable and executable. And an override bit value 11 means the page is readable and writeable. Other embodiments may substitute alternative encodings, such as a 10 bit value indicating the page is executable only. Alternatively, each two bit override may incrementally improve a base permission. For example, if the root mapping permission is execute-only, then an override value of 00b maintains the base permission, override value of 01b makes the page readable and executable, 10b makes the page executable and writeable, and an override value of 11b makes the page readable, writeable and executable. As a third example, each four bit override may selectively upgrade each of the read, write, and execute permissions individually, with a single reserved bit to align the groups of permission overrides to a power of two boundary.

In alternative embodiments, the permissions page 2710 may be expanded to require 8 pages of storage for one bit permission overrides so that each bit overrides the permissions for a single page. Similarly, the permissions page 2710 may be expanded to require 16 or 32 pages of storage for two bit or four bit permission overrides, respectively, so that each permission override applies to a single page.

FIG. 27B illustrates how a permissions override operation is applied to a region 2700 of the CR3 hierarchy including a particular PD page 1305, and all associated page table pages 1306, 2706 and data pages 1307, 2707 (i.e., all paging structures beneath the PD page 1305 in the hierarchy). Thus, the bits specified in the permissions page 2710 will set the permissions for this particular region 2700 of the CR3 paging structure.

In one embodiment, if a bit is set in the permissions page 2710, the permissions of the group of 8 pages changes to one level above (e.g., +1) the permissions of the root CR3 superprocess paging structure. Using this technique, one page can store permissions for 32K*8 pages (one bit per page*8). If the page is not present in the root CR3 superprocess paging structure, then it is also not present in the PIT-indexed paging structure regardless of the permissions page override. In this way, the OS only needs to manage updates to the root CR3 superprocess paging structure for memory mappings (i.e., only one paging structure needs to be updated when paging to/from storage). A new page table entry bit may be used to indicate if the leaf is a permissions page 2710 or a page directory 2603.

In operation, the OS sets the CR3 register 1301 to the root paging structure and this handles all the shared memory mappings. The PIT 2300 will hold a list of sub-process paging structures, that defer to the root paging structure. The index into the PIT 2300 is set by the new user space instruction (SWITCHSP) or may be set by the kernel (or other privileged software component).

In one embodiment, invoking a far branch to the new PCID as described above causes the process to switch to the sub-process index register. The subprocess PCID address space ID (ASID) tags are then used in the TLB, including the data TLB (dTLB) and instruction TLB (iTLB). However, in one implementation, ASID tags are optional, and may be used on some TLBs and not others within a given processor. Note that the iTLB can be global across subprocesses as the memory mappings and executable code paths do not need to change. The control flow may be verified using endbranch/ DAV branch target instructions (specifying a valid sub process entry point) and the subprocess permissions paging structure for the destination subprocess will be walked on a TLB miss (e.g., when accessing data in the destination subprocess). The current PCID index can be read as well to verify access control permissions when entering a subprocess, where there is an index register to store the caller's PCID index for access control verification. This improves the security of the model as well, enabling a callee subprocess to verify the caller sub-process within the superprocess.

One embodiment of the invention includes optimized TLB management. Because the PIT paging structures refer to permission pages only, the iTLB can be shared, and treated as a global resource. The data TLB can be tagged with the PCID and/or other address space ID translation as described above. Furthermore, the dTLB can be partitioned into a memory translation TLB based on the root CR3 being the tag identifier, where the PCID permission table is a substructure used to cache the permissions of a permission table for that root CR3.

The embodiments of the invention described above provide numerous benefits over existing systems including improvements to memory savings, performance, scalability, and security. In particular, the super-process paging structure is fully populated while sub-process paging structures only contain the deltas, thus saving memory over reproducing redundant paging structures across different processes. Meanwhile, Heap and Stack structures as well as code may be shared across all sub-processes, with only changes to permissions depending on the current sub-process on a page-by-page basis.

Moreover, because of the ring-3 sub-process switching described above, latency is improved over today's process switching which requires a ring transition, a MOV CR3 instruction, followed by another ring transition. Further optimizations such as sharing the iTLB across sub-processes and additional ASIDs may further improve performance.

With respect to scalability, thousands of subprocesses are enabled. Because there is a super-process paging structure, all page remapping updates can be done to this one base paging structure without the need to change all subprocesses paging structures. This way only one paging structure update needs be done and not thousands when paging in and out to storage. Also, because additional address space is not consumed in the paging structures (as with protection keys), all available address space may be used.

Finally, because these embodiments still implement address space isolation, any side channel protections that may be in place for separate address spaces may still apply. A new ENDBRANCH instruction identifying endpoints to subprocesses and caller subprocess identification also allows efficient access control across sub-processes.

Some embodiments may include accessed and dirty bits in PIT paging structures in addition to the accessed and dirty bits in CR3-based page tables. The processor may update the accessed and dirty bits in just the PIT paging structures or CR3-based page tables that were used to generate an address mapping, or it may update the accessed and dirty bits in any paging structure entry or page table entry that corresponds to the linear address being accessed.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

EXAMPLES

The following are example implementations of different embodiments of the invention.

Example 1

A processor comprising: execution circuitry to execute instructions and process data; memory management circuitry coupled to the execution circuitry, the memory management circuitry to manage access to a system memory by a plurality of related processes using one or more process-specific translation structures and one or more shared translation structures to be shared by the related processes; and one or more control registers to store a process-specific base address pointer associated with a first process of the plurality of related processes and to store a shared base address pointer to identify the shared translation structures; wherein the memory management circuitry is to use the process-specific base address pointer in combination with a first linear address provided by the first process to walk the process-specific translation structures to identify any permissions and/or physical address associated with the first linear address, wherein when permissions are identified, the memory management circuitry is to use the permissions in place of any permissions specified in the shared translation structures.

Example 2

The processor of example 1 wherein the one or more control registers comprise: a first control register to store the process-specific base address pointer associated with a first process of the plurality of related processes; and a second control register to store the shared base address pointer to identify the shared translation structures.

Example 3

The processor of example 1 further comprising: a translation lookaside buffer (TLB) to store a plurality of address translation entries comprising mappings of linear addresses to physical addresses, one or more of the address translation entries to be associated with the first process based on a process identification field included in the one or more address translation entries.

Example 4

The processor of example 3 wherein the memory management circuitry is to initially query the TLB to determine when any entry exists for the first linear address and is to walk the process-specific translation structures only when no TLB entry for the first linear address is found.

Example 5

The processor of example 4 wherein the memory management circuitry is to update the TLB with an entry including the physical address and/or permissions resulting from the walk of the process-specific translation structures.

Example 6

The processor of example 1 wherein when permissions are not found in the process-specific translation structures, the memory management circuitry is to use the shared base address pointer and the first linear address to walk the shared translation structures to identify shared permissions associated with the first linear address and to use the shared permissions to manage access to the physical address associated with the first linear address.

Example 7

The processor of example 6 wherein when permissions are identified in the process-specific translation structure but the physical address is not identified, the memory management circuitry is to walk the shared translation structures to determine the physical address associated with the first linear address and is to use the permissions to manage access to the physical address.

Example 8

The processor of example 7 wherein the process-specific translation structure is to specify the permissions at a higher level of granularity than the shared translation structures such that the memory management circuitry is to apply the permissions to region of the shared translation structures indicated by the granularity.

Example 9

The processor of example 8 wherein the shared translation structures comprise a hierarchical arrangement of translation tables and wherein the permissions are applied to a first table and all other tables and/or entries under the first table in the hierarchical arrangement.

Example 10

The processor of example 1 wherein the plurality of related processes are related as a super-process by an operating system or management component.

Example 11

A method comprising: executing a plurality of related processes using one or more process-specific translation structures and one or more shared translation structures to be shared by the related processes; and storing a process-specific base address pointer associated with a first process of the plurality of related processes in one or more control registers; storing a shared base address pointer to identify the shared translation structures in the one or more control registers; walking the process-specific translation structures using the process-specific base address pointer in combination with a first linear address provided by the first process to identify any permissions and/or physical address associated with the first linear address; and using the permissions, when identified, in place of any permissions specified in the shared translation structures.

Example 12

The method of example 11 wherein the one or more control registers comprise: a first control register to store the process-specific base address pointer associated with a first process of the plurality of related processes; and a second control register to store the shared base address pointer to identify the shared translation structures.

Example 13

The method of example 11 further comprising: a translation lookaside buffer (TLB) to store a plurality of address translation entries comprising mappings of linear addresses to physical addresses, one or more of the address translation entries to be associated with the first process based on a process identification field included in the one or more address translation entries.

Example 14

The method of example 13 wherein the memory management circuitry is to initially query the TLB to determine when any entry exists for the first linear address and is to walk the process-specific translation structures only of no TLB entry for the first linear address is found.

Example 15

The method of example 14 wherein the memory management circuitry is to update the TLB with an entry including the physical address and/or permissions resulting from the walk of the process-specific translation structures.

Example 16

The method of example 11 wherein when permissions are not found in the process-specific translation structures, the memory management circuitry is to use the shared base address pointer and the first linear address to walk the shared translation structures to identify shared permissions associated with the first linear address and to use the shared permissions to manage access to the physical address associated with the first linear address.

Example 17

The method of example 16 wherein when permissions are identified in the process-specific translation structure but the physical address is not identified, the memory management circuitry is to walk the shared translation structures to determine the physical address associated with the first linear address and is to use the permissions to manage access to the physical address.

Example 18

The method of example 17 wherein the process-specific translation structure is to specify the permissions at a higher level of granularity than the shared translation structures such that the memory management circuitry is to apply the permissions to region of the shared translation structures indicated by the granularity.

Example 19

The method of example 18 wherein the shared translation structures comprise a hierarchical arrangement of translation tables and wherein the permissions are applied to a first table and all other tables and/or entries under the first table in the hierarchical arrangement.

Example 20

The processor of example 11 wherein the plurality of related processes are related as a super-process by an operating system or management component.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
    execution circuitry to execute instructions and process data;
    memory management circuitry coupled to the execution circuitry, the memory management circuitry to manage access to a system memory by a virtual machine (VM) and a plurality of sub-processes executed in the VM, the memory management circuitry to access a first lookup structure to determine permissions associated with the VM and to access a second lookup structure to determine sub-process permissions associated with the sub-processes; and
    one or more control registers to store a first base address pointer associated with the first lookup structure and a second base address pointer associated with the second lookup structure;
    wherein the memory management circuitry is to use the first base address pointer in combination with a first linear address provided by the VM to walk the first lookup structure to identify a first set of permissions and/or physical addresses associated with the first linear address, and is to use the second base address pointer to identify an entry in the second lookup structure, the entry to store a second set of permissions associated with a corresponding sub-process, the memory management circuitry to determine whether to allow access to the system memory based on the second set of permissions.

2. The processor of claim 1 wherein the one or more control registers comprise:
    a first control register to store the first base address pointer to identify the first lookup structure; and
    a second control register to store the second base address pointer to identify the second lookup structure.

3. The processor of claim 2 wherein the first lookup structure comprises a first set of page tables associated with the VM.

4. The processor of claim 3 wherein the one or more control registers to store the first base address pointer comprises a first control register to store a first address space identifier associated with the VM.

5. The processor of claim 1 further comprising:
    a translation lookaside buffer (TLB) to store a plurality of address translation entries comprising mappings of linear addresses to physical addresses, one or more of the address translation entries to be associated with the VM based on an address space identifier field included in the one or more address translation entries.

6. The processor of claim 5 wherein one or more of the address translation entries are to store at least a portion of the first set of permissions and/or the second set of permissions.

7. The processor of claim 6 wherein the memory management circuitry is to initially query the TLB to determine when any entry exists for the first linear address and is to walk the first lookup structure only when no TLB entry for the first linear address is found.

8. The processor of claim 7 wherein the second set of permissions includes a read permission indication, a write permission indication, and an execute permission indication.

9. A method comprising:
    executing instructions and processing data on execution circuitry;
    managing, by memory management circuitry coupled to the execution circuitry, access to a system memory by a virtual machine (VM) and a plurality of sub-processes executed in the VM, the memory management circuitry to access a first lookup structure to determine permissions associated with the VM and to access a second lookup structure to determine sub-process permissions associated with the sub-processes; and
    storing, in one or more control registers, a first base address pointer associated with the first lookup structure and a second base address pointer associated with the second lookup structure;
    wherein the memory management circuitry is to use the first base address pointer in combination with a first linear address provided by the VM to walk the first lookup structure to identify a first set of permissions and/or physical addresses associated with the first linear address, and is to use the second base address pointer to identify an entry in the second lookup structure, the entry to store a second set of permissions associated with a corresponding sub-process, the memory management circuitry to determine whether to allow access to the system memory based on the second set of permissions.

10. The method of claim 9 wherein the one or more control registers comprise:
    a first control register to store the first base address pointer to identify the first lookup structure; and
    a second control register to store the second base address pointer to identify the second lookup structure.

11. The method of claim 10 wherein the first lookup structure comprises a first set of page tables associated with the VM.

12. The method of claim 11 wherein the first base address pointer comprises a first address space identifier associated with the VM.

13. The method of claim 9 further comprising:
    storing, in a translation lookaside buffer (TLB), a plurality of address translation entries comprising mappings of linear addresses to physical addresses, one or more of the address translation entries to be associated with the VM based on an address space identifier field included in the one or more address translation entries.

14. The method of claim 13 wherein one or more of the address translation entries are to store at least a portion of the first set of permissions and/or the second set of permissions.

15. The method of claim 14 wherein the memory management circuitry is to initially query the TLB to determine when any entry exists for the first linear address and is to walk the first lookup structure only when no TLB entry for the first linear address is found.

16. The method of claim 15 wherein the second set of permissions includes a read permission indication, a write permission indication, and an execute permission indication.

17. A non-transitory machine-readable medium having program code stored thereon which, when executed by a machine, causes the machine to perform the operations of: executing instructions and processing data on execution circuitry; managing, by memory management circuitry coupled to the execution circuitry, access to a system memory by a virtual machine (VM) and a plurality of sub-processes executed in the VM, the memory management circuitry to access a first lookup structure to determine permissions associated with the VM and to access a second lookup structure to determine sub-process permissions associated with the sub-processes; and storing, in one or more control registers, a first base address pointer associated with the first lookup structure and a second base address pointer associated with the second lookup structure; wherein the memory management circuitry is to use the first base address pointer in combination with a first linear address provided by the VM to walk the first lookup structure to identify a first set of permissions and/or physical addresses associated with the first linear address, and is to use the second base address pointer to identify an entry in the second lookup structure, the entry to store a second set of permissions associated with a corresponding sub-process, the memory management circuitry to determine whether to allow access to the system memory based on the second set of permissions.

18. The non-transitory machine-readable medium of claim 17 wherein the one or more control registers comprise: a first control register to store the first base address pointer to identify the first lookup structure; and a second control register to store the second base address pointer to identify the second lookup structure.

19. The non-transitory machine-readable medium of claim 18 wherein the first lookup structure comprises a first set of page tables associated with the VM.

20. The non-transitory machine-readable medium of claim 19 wherein the first base address pointer comprises a first address space identifier associated with the VM.

21. The non-transitory machine-readable medium of claim 17 further comprising program code to cause the machine to perform the operations of: storing, in a translation lookaside buffer (TLB), a plurality of address translation entries comprising mappings of linear addresses to physical addresses, one or more of the address translation entries to be associated with the VM based on an address space identifier field included in the one or more address translation entries.

22. The non-transitory machine-readable medium of claim 21 wherein one or more of the address translation entries are to store at least a portion of the first set of permissions and/or the second set of permissions.

23. The non-transitory machine-readable medium of claim 22 wherein the memory management circuitry is to initially query the TLB to determine when any entry exists for the first linear address and is to walk the first lookup structure only when no TLB entry for the first linear address is found.

24. The non-transitory machine-readable medium of claim 23 wherein the second set of permissions includes a read permission indication, a write permission indication, and an execute permission indication.

* * * * *